US011481131B2

(12) United States Patent
Dar et al.

(10) Patent No.: US 11,481,131 B2
(45) Date of Patent: Oct. 25, 2022

(54) TECHNIQUES FOR ESTIMATING DEDUPLICATION BETWEEN STORAGE VOLUMES

(71) Applicant: EMC IP Holding Company LLC, Hopkinton, MA (US)

(72) Inventors: Shaul Dar, Petach Tikva (IL); Uri Shabi, Tel Mond (IL); Ronen Gazit, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 41 days.

(21) Appl. No.: 17/110,672

(22) Filed: Dec. 3, 2020

(65) Prior Publication Data

US 2022/0179574 A1 Jun. 9, 2022

(51) Int. Cl.
*G06F 3/06* (2006.01)
*G06F 17/18* (2006.01)
*H04L 9/32* (2006.01)

(52) U.S. Cl.
CPC .......... *G06F 3/0641* (2013.01); *G06F 3/0608* (2013.01); *G06F 3/0665* (2013.01); *G06F 3/0683* (2013.01); *G06F 17/18* (2013.01); *H04L 9/3236* (2013.01)

(58) Field of Classification Search
CPC .... G06F 3/0641; G06F 3/0608; G06F 3/0665; G06F 3/0683; G06F 17/18; H04L 9/3236
See application file for complete search history.

(56) References Cited

U.S. PATENT DOCUMENTS

| 2014/0059015 | A1  | 2/2014  | Zinar et al. |
| 2018/0074745 | A1* | 3/2018  | Harnik ................. G06F 3/067 |
| 2018/0121819 | A1* | 5/2018  | Manasse ............... G06F 17/18 |
| 2019/0370355 | A1  | 12/2019 | Kucherov et al. |
| 2020/0134049 | A1  | 4/2020  | Bassov et al. |

OTHER PUBLICATIONS

International Search Report dated Aug. 26, 2021.
Pmigdal, et al., "Jaccard index," Wikipedia, Apr. 4, 2017, pp. 1-7, XP055489664, http://en.wikipedia.org/w/index.php?title=Jaccard_index&oldid=773856787.

* cited by examiner

*Primary Examiner* — Eric Cardwell
(74) *Attorney, Agent, or Firm* — Muirhead and Saturnelli, LLC

(57) ABSTRACT

Determining and using deduplication estimates may include: determining two deduplication sample indexes (DSIs) for two logical device sets each including one or more logical devices, determining a Jaccard Similarity for the two DSIs, wherein the Jaccard Similarity denotes a measurement of similarity and mutual deduplication between the two logical device sets; determining, in accordance with one or more criteria, whether the two logical device sets should be located in different data storage systems or a same data storage system that performs data deduplication, wherein the one or more criteria uses the Jaccard Similarity in determining whether to locate the two logical device sets in the same data storage system or the different data storage systems; and responsive to determining that the two logical device sets should be located in the same data storage system, locating the two logical device sets in the same data storage system.

21 Claims, 7 Drawing Sheets

TECHNIQUES FOR ESTIMATING DEDUPLICATION BETWEEN STORAGE VOLUMES

BACKGROUND

Technical Field

This application generally relates to data storage.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for determining and using deduplication estimates comprising: determining a first data deduplication sample index (DSI) for a first logical device set of one or more logical devices and a second DSI for a second logical device set of one or more logical devices; determining a Jaccard Similarity for the first DSI and the second DSI, wherein the Jaccard Similarity denotes a measurement of similarity and mutual deduplication regarding a number of data blocks of the first logical device set expected to match data blocks of the second logical device set; determining, in accordance with one or more criteria, whether the first logical device set and the second logical device set should be located in different data storage systems or a same data storage system that performs data deduplication with respect to data blocks stored on the first logical device set and the second logical device set, wherein the one or more criteria uses the Jaccard Similarity in determining whether to locate the first logical device set and the second logical device set in the same data storage system or the different data storage systems; and responsive to determining that the first logical device set and the second logical device set should be located in the same data storage system, locating the first logical device set and the second logical device set in the same data storage system.

In at least one embodiment, processing may include determining, using the Jaccard Similarity for the first DSI and the second DSI, a number of expected identical data blocks between the first logical device set and the second logical device set, wherein the criteria uses the number of expected identical data blocks in determining whether to locate the first logical device set and the second logical device set in the same data storage system or different data storage systems. An estimated deduplication percentage may be determined using the number of expected blocks, and the one or more criteria may specify to locate the first logical device set and the second logical device set in the same data storage system if the estimated deduplication percentage is greater than a specified threshold percentage. The estimated deduplication percentage may be determined as a percentage of a size of the first logical device set or as a percentage of a size of the second logical device set. The one or more criteria may specify that the first logical device set and the second logical device set should be located in the same data storage system if the Jaccard Similarity for the first DSI and the second DSI is greater than a specified threshold.

In at least one embodiment, the Jaccard Similarity for the first DSI and the second DSI may be determined as a first size divided by a second size, wherein the first size denotes a number of elements in a set intersection of data blocks of the first logical device set and the second logical device set, and wherein the second size denotes a number of elements in a set union of data blocks of the first logical device set and the second logical device set.

In at least one embodiment, a first plurality of data blocks may be stored in the first logical device set, and processing may include generating, using a hash function, a first plurality of hash values for the first plurality of data blocks. The hash function may generate hash values in a first range, and wherein the first DSI for the first logical device set may include a first portion of the first plurality of hash values within a first subrange of the first range. A second plurality of data blocks may be stored in the second logical device set, and processing may include generating, using the hash function, a second plurality of hash values for the second plurality of data blocks. The second DSI for the second logical device set may include a second portion of the second plurality of hash values within the first subrange of the first range. The first subrange may be a particular size denoting a number hash values from a minimum value to a maximum value, and first processing may be performed to select the particular size from a plurality of different candidate sizes for the first subrange.

In at least one embodiment, the step of determining whether to locate the first logical device set and the second logical device set in the same data storage system or different data storage systems and the step of locating the first logical device set and the second logical device set in the same data storage system may be performed in connection with load balancing in a cluster including the same data storage system and one or more additional data storage systems. The same data storage system may include two processing nodes and the load balancing may further determine, in accordance with the one or more criteria, to service I/Os directed to both the first logical device set and the second logical device set using a first of the two processing nodes as a preferred one of the two processing nodes. The first logical device set and the second logical device set may be configured for remote replication from the same data storage system to a same target data storage system that performs deduplication.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
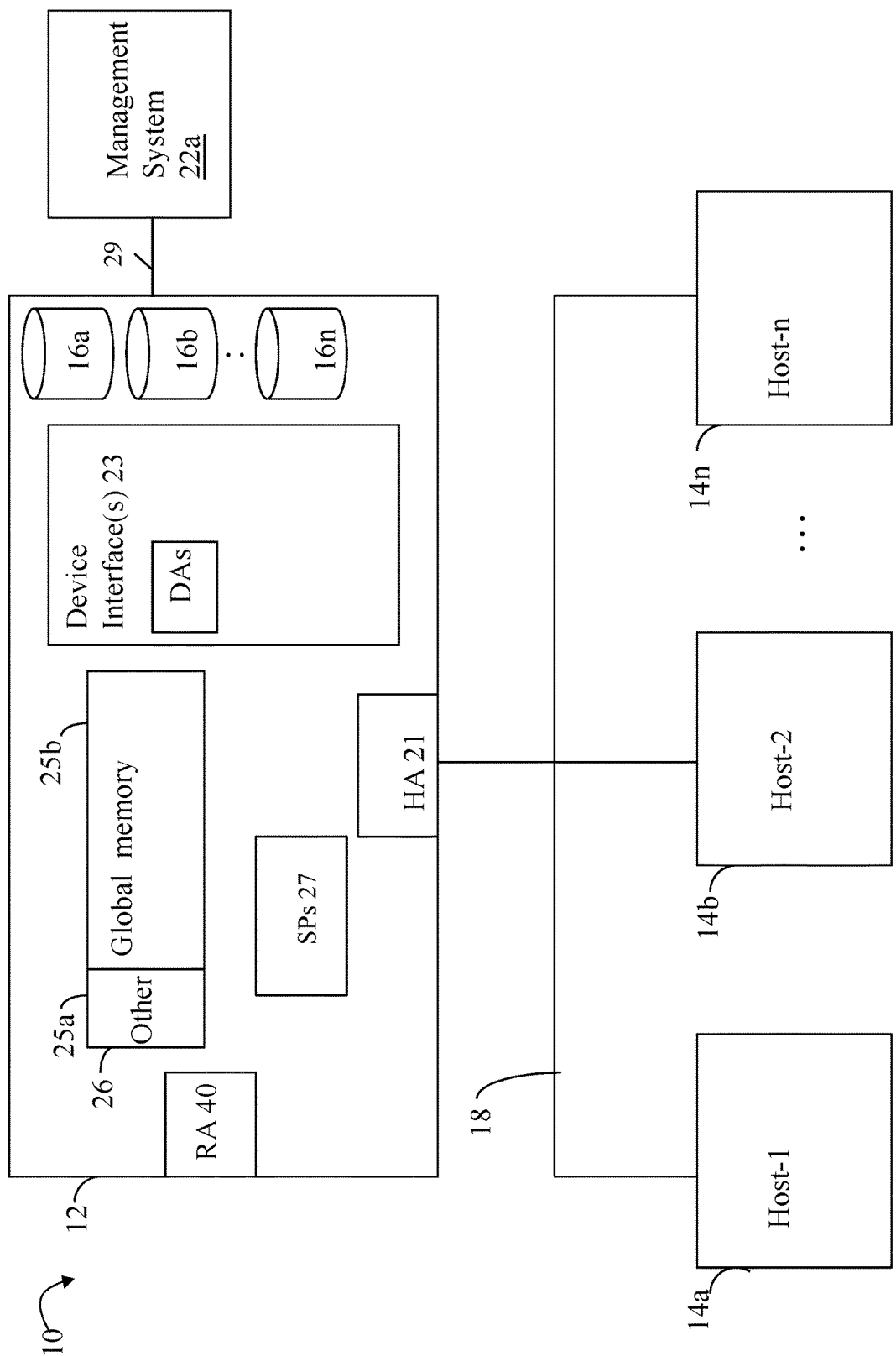
FIG. 1 is an example of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS or network file server), and the like. Some or all of the connections by which the hosts 14a-14n and the data storage system 12 may be connected to the communication medium 18 may pass through other communication devices, such as switching equipment, a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although the element 12 is illustrated as a single data storage system, such as a single data storage array, the element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of controllers, adapters or directors, such as an HA 21 (host adapter), RA 40 (remote adapter), and/or device interface(s) 23. Each of the adapters (sometimes also known as controllers, directors or interface components) may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage device interfaces 23 may include device interface modules, for example, one or more disk adapters (DAs) (e.g., disk controllers) for interfacing with the flash drives or other physical storage devices (e.g., PDS 16a-n). The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, the HAs and/or the RAs in a data storage array. In one embodiment, the device interfaces 23 may perform data operations using a system cache that may be included in the global memory 25b, for example, when communicating with other device interfaces and other components of the data storage array. The other portion 25a is that portion of the memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices or volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may include one or more type of device interface used in connection with facilitating data transfers to/from the associated disk drive(s) and LUN (s) residing thereon. For example, such device interfaces may include a device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

In some embodiments, each of the different adapters, such as each HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

An embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, the techniques herein may be used in connection with any suitable storage system, appliance, device, and the like, in which data is stored. For example, an embodiment may implement the techniques herein using a midrange data storage system, such as a Dell EMC Unity® data storage system or a Dell EMC PowerStore® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on management system 22*a* to the data storage system 12. Such commands may be, for example, to establish or modify data services, provision storage, perform user account management, and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22*a* to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

An embodiment of a data storage system in accordance with the techniques herein may perform different data processing operations or services on data stored on the data storage system. For example, the data storage system may perform one or more data reduction operations, such as data deduplication and data compression. Such data reduction operations attempt to reduce the amount of storage needed for storing data on non-volatile backend storage devices (e.g., PDs) with the goal of reducing the cost per unit of storage consumed (e.g., dollar cost per GB of storage). Generally, data deduplication techniques are known in the art and any suitable such technique may be used in an embodiment in accordance with the techniques herein.

In at least one embodiment in accordance with the techniques herein, data deduplication processing performed may include digest or hash value computation using an algorithm such as based on the SHA-256 cryptographic hashing algorithm known in the art. Data deduplication generally refers to removing redundant or duplicate data portions. Data deduplication techniques look for duplicate data blocks whereby only a single instance of the data block is retained (i.e., stored on physical storage).

Figure 2A:
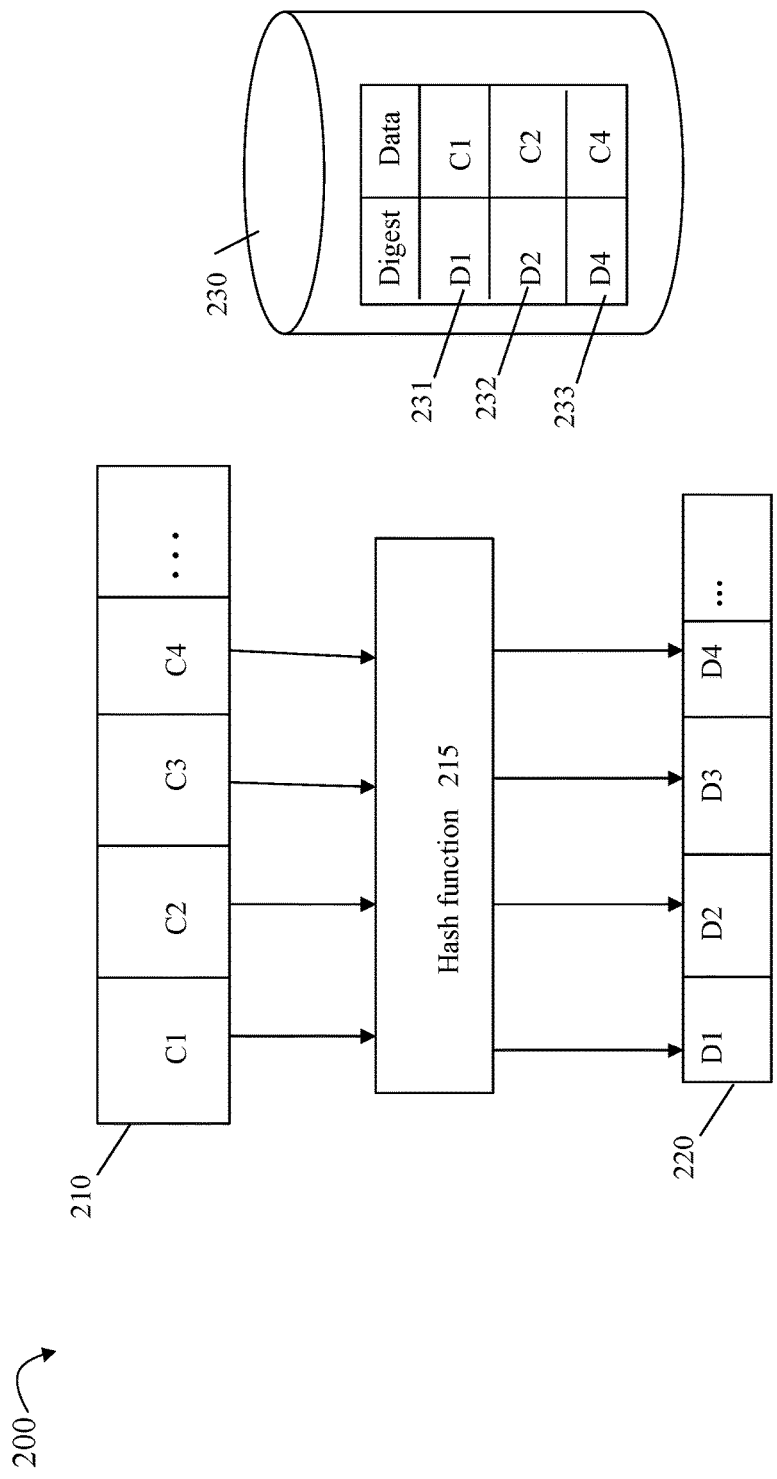
FIG. 2A is an example illustrating data deduplication as may be performed in an embodiment in accordance with the techniques herein.

Referring to the FIG. 2A, shown is an example 200 illustrating processing that may be performed in connection with data deduplication processing in an embodiment in accordance with the techniques herein. The element 210 may denote the original data being written or stored on back-end non-volatile storage. The original data may be partitioned into multiple data blocks C1, C2, C3, C4 and the like. In at least one embodiment and for purposes of illustration, the data blocks may all be the same size where the size may vary with embodiment. Each block may be provided as an input to hash function 215. As noted above, in at least one embodiment, the hash function 215 may be the SHA-256 hashing algorithm, or more generally, any suitable cryptographic, or non-cryptographic hashing function known in the art. For each block of 210, the hash function 215 may perform processing and generate, as an output, a hash value, hash or digest derived from the block 210. The element 220 includes hashes D1, D2, D3, D4, and the like, where a corresponding different one of the hashes DN is generated for each one of the blocks CN (where "N" is an integer denoting the block and associated hash value generated for that block). For example, D1 is the hash generated for C1, D2 is the hash generated for C2, D3 is the hash generated for C3, and so on. Generally, a hash function 215 is selected which has an acceptably low probability of a "hash collision" of generating the same digest or hash value for two different blocks having different content. The strength of the hash function 215 may be measured by the unlikelihood of a collision occurring where two different input blocks of data produce the same hash. The strength increases, for example, with the bit length of the hash value, hash or digest. Although the chance of a hash collision may be very low due to use of a strong hash function, when two blocks C1 and C3 have the same hashes, respectively, where D1=D3, processing may be performed to further compare the content of the blocks C1 and C3 to ensure the actual data blocks are identical. If two blocks, such as C1 and C4, have different hashes whereby D1 does not equal D4, then blocks C1 and C4 do not match (e.g., are different or non-matching data blocks). In cases where two blocks are determined to be identical, only a single copy of the data block is stored on backend non-volatile physical storage of the data storage system. The single stored instance of the data block may be referenced one or more times as needed using a pointer, handle, the hash of the block, and the like.

The element 230 of the FIG. 2A may denote the data store, such as a data base (DB) used to store data blocks. In this example, as noted above, assume blocks C1 and C3 are the same with remaining blocks C2 and C4 being unique. In at least one embodiment, the data store 230 may be organized and managed using a data structure, such as a hash table. In at least one embodiment, computed hashes, or portions thereof, may be used as an index into the hash table where the single unique instances of data blocks may be stored along with other metadata as may be needed for maintaining the table and also in accordance with the particular hash table management used in an embodiment. For example, a reference count may be stored with each unique data block denoting the number of references or occurrences of the unique data block in stored data. Hash tables are data structures known in the art. A hash table uses a hash function to compute an index into an array of buckets or slots, from which the desired data can be found. In this example, the block of data may be mapped by hash function 215, and thus by the block's hash, to a particular entry in the table at which the block of data is stored. To further illustrate, the hash function 215 may be used to generate a hash value, hash or digest for a particular data block. The hash is then further mapped (e.g., such as by another mathematical function, using particular portions of the hash, and the like) to a particular index or entry of the hash table. The particular mapping used to map the hash to a corresponding table entry varies, for example, with the hash and the size of hash table.

When storing a new data block, such as C1, its hash may be mapped to a particular hash table entry 231 whereby if the table entry is null/empty, or otherwise does not already include a data block matching C1, then C1 is stored in the table entry along with its associated hash D1 (this is the first time block C1 is recorded in the data store 230). Otherwise, if there is already an existing entry in the table including a data block matching C1, the new data block C1 may be compared to the existing data block having the existing hash D1 to ensure that the new data block is indeed a duplicate of the existing data block. In this example as noted above, processing is performed for C1, C2, and C4 respectively, where entries 231, 232, and 233 are added since there are no existing matching entries in the hash table. When processing block C3, as noted above, C3 has a hash D3 matching D1 whereby C3 (and thus D3) maps to entry 231 of the hash table already including a matching block C1 (so no additional data block is added to 230 for C3 since C3 is determined as a duplicate of C1). In connection with representing a particular file or other storage entity including multiple duplicate occurrences of a particular block such as C3, the single instance of the data may be stored in 230. Additionally, a handle or reference, such as identifying the hash table entry 231, its hash, and the like, may be used to reference the single instance or copy in the data storage in 230. When reconstructing or restoring data to its original form, the handle or reference into the hash table for block C3 may be used to obtain the actual block C3 of data from 230.

Figure 2B:
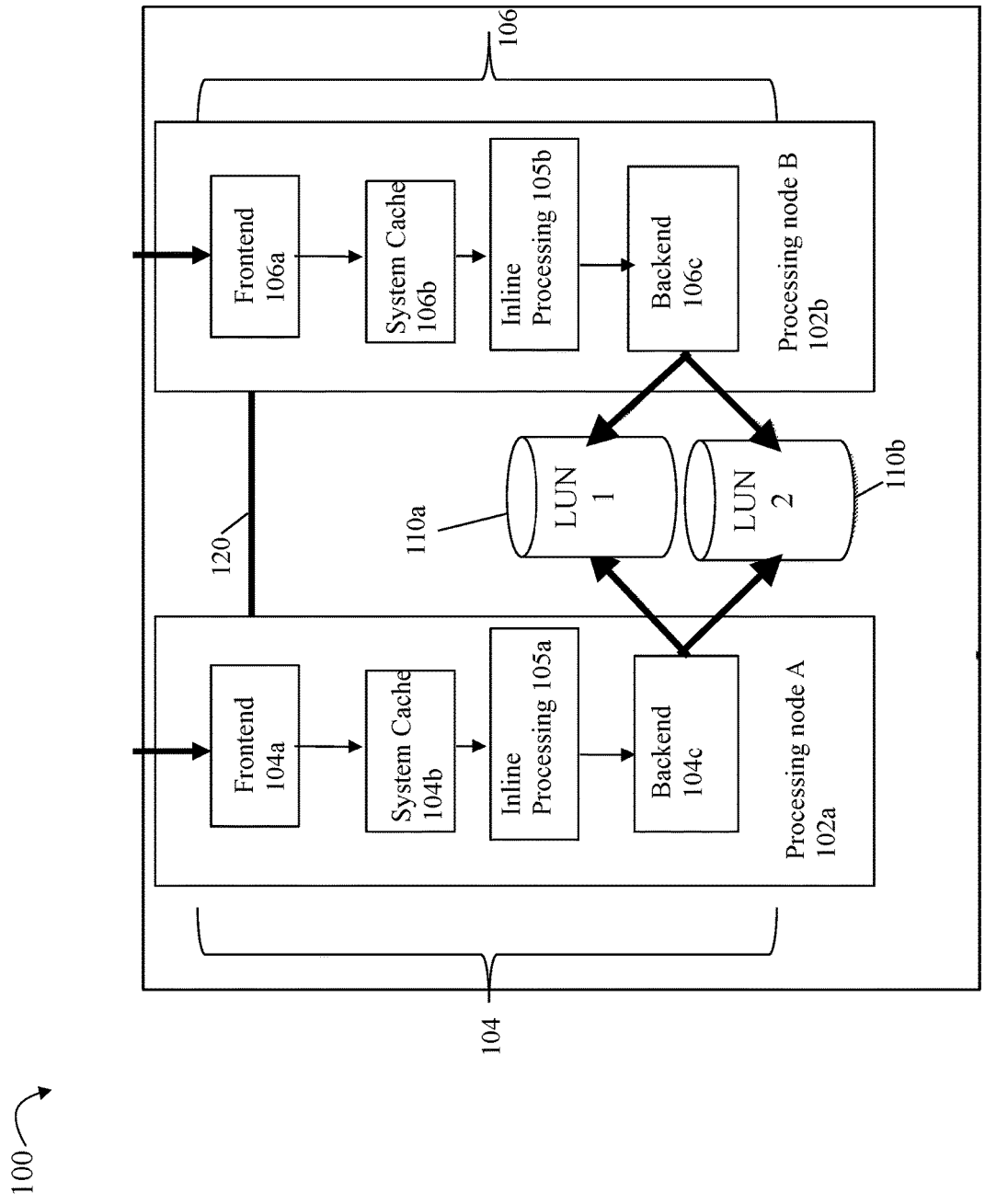
FIG. 2B is an example illustrating the I/O path or data path in connection with processing data in an embodiment in accordance with the techniques herein.

With reference to the FIG. 2B, shown is an example 100 illustrating components that may be included in the data path in at least one existing data storage system in accordance with the techniques herein. The example 100 includes two processing nodes A 102a and B 102b and the associated software stacks 104, 106 of the data path, where I/O requests may be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing may be performed by layer 105a. Such inline processing operations of 105a may be optionally performed and may include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include, for example, performing one or more data reduction operations such as data deduplication or data compression. The inline processing 105a, 105b may include performing any suitable or desirable data processing operations as part of the I/O or data path.

Data deduplication generally refers to removing redundant or duplicate data portions. Data deduplication techniques may include detecting duplicate data chunks whereby only a single instance of a unique data chunk is stored, and where there may be multiple one or more pointers or references to the single stored instance of the unique data chunk.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O may be directed to a location or logical address of a LUN and where data may be read from, or written to, the logical address. The LUNs 110a, 110b are examples of storage objects representing logical storage entities included in an existing data storage system configuration. Since, in this example, writes directed to the LUNs 110a, 110b may be received for processing by either of the nodes 102a and 102b, the example 100 illustrates what may also be referred to as an active-active configuration.

In connection with a write operation as may be received from a host and processed by the processing node A 102a, the write data may be written to the system cache 104b, marked as write pending (WP) denoting it needs to be written to the physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations may be performed. For example, the inline processing may include performing data compression processing, data deduplication processing, and the like, that may convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b may be stored in a modified form where processing is performed by 105a to restore or convert the modified form of the data to its original data form prior to returning the requested read data to the host.

Also illustrated in FIG. 2B is an internal network interconnect 120 between the nodes 102a, 102b. In at least one embodiment, the interconnect 120 may be used for internode communication between the nodes 102a, 102b.

In connection with at least one embodiment in accordance with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage. For example, in at least one embodiment, a RAM based memory may be one of the caching layers used as to cache the write data that is then flushed to the backend physical storage.

When the processor performs processing, such as in connection with the inline processing 105a, 105b as noted above, data may be loaded from the main memory and/or other lower cache levels into its CPU cache. In particular, inline data deduplication (ILD) and inline compression (ILC) may be performed as part of the inline processing 105a, 105b. An embodiment may perform deduplication processing inline as part of the data path or I/O path. More generally, deduplication may be performed at any suitable time supported in an embodiment. For example, in at least one embodiment, deduplication processing may also be performed offline not as part of the data path or I/O path on data stored on BE PDs. An embodiment may perform compression processing inline as part of the data path or I/O path. More generally, compression processing may be performed at any suitable time supported in an embodiment. For example, in at least one embodiment, compression processing may also be performed offline not as part of the data path or I/O path on data stored on BE PDs.

Some existing implementations of deduplication use a deduplication data store (dedupe data store or DB) as described in connection with the element 230 of the FIG. 2A having a hash table organized by indices which are randomly distributed and approximate a uniform distribution.

Consistent with other discussion herein, data deduplication may be performed at the data block level of granularity, for example, where each entry of the data store 230 is mapped to a single unique data block. As sometimes used herein, a target data block, target block or dedupe target refers to a single unique instance of a data block currently stored in the dedupe data store 230. Also sometimes used herein, reference is made to a candidate data block, candidate block or dedupe candidate that refers to a data block for which deduplication processing is performed with the goal of eliminating duplicate candidate blocks from being stored. A hash may be computed for the candidate data block using a hash function whereby the hash identifies the candidate data block with a high level of uniqueness, even though the hash is typically much smaller than the candidate data block itself. Hashes thus enable data block matching between the candidate and target data blocks in the dedupe data store 230 to proceed quickly and efficiently. Consistent with discussion above, for each hash in an entry of the dedupe data store 230, the data store 230 may store a pointer that leads to a stored version of the respective target data block. To perform deduplication on a particular candidate block, a storage system computes a hash of the candidate block and searches the dedupe data store 230, or a cached version thereof, for an entry that matches the computed hash. If a match is found, the storage system may then compare the actual content of the target block with the content of the candidate block to ensure the target and candidate data blocks having matching content. If the target and candidate data blocks having matching content, processing may arrange metadata of the candidate block to point to the target data block that the dedupe data store 230 has associated with the matching hash. In this manner, a duplicate copy of the data block is avoided.

In at least one embodiment, the data storage system may be configured to include one or more pairs of nodes, where each pair of nodes may be generally as described and represented as the nodes 102a-b in the FIG. 2B. For example, a data storage system may be configured to include at least one pair of nodes and at most a maximum number of node pairs, such as for example, a maximum of 4 node pairs. The maximum number of node pairs may vary with embodiment. In at least one embodiment, a base enclosure may include the minimum single pair of nodes and up to a specified maximum number of PDs. In some embodiments, a single base enclosure may be scaled up to have additional BE non-volatile storage using one or more expansion enclosures, where each expansion enclosure may include a number of additional PDs. Further, in some embodiments, multiple base enclosures may be grouped together in a load-balancing cluster to provide up to the maximum number of node pairs. Consistent with other discussion herein, each node may include one or more processors and memory. In at least one embodiment, each node may include two multi-core processors with each processor of the node having a core count of between 8 and 28 cores. In at least one embodiment, the PDs may all be non-volatile SSDs, such as flash-based storage devices and storage class memory (SCM) devices. It should be noted that the two nodes configured as a pair may also sometimes be referred to as peer nodes. For example, the node A 102a is the peer node of the node B 102b, and the node B 102b is the peer node of the node A 102a.

In at least one embodiment, the data storage system may be configured to provide both block and file storage services with a system software stack that includes an operating system running directly on the processors of the nodes of the system.

In at least one embodiment, the data storage system may be configured to provide block-only storage services (e.g., no file storage services). A hypervisor may be installed on each of the nodes to provide a virtualized environment of virtual machines (VMs). The system software stack may execute in the virtualized environment deployed on the hypervisor. The system software stack (sometimes referred to as the software stack or stack) may include an operating system running in the context of a VM of the virtualized environment. Additional software components may be included in the system software stack and may also execute in the context of a VM of the virtualized environment.

In at least one embodiment, each pair of nodes may be configured in an active-active configuration as described elsewhere herein, such as in connection with FIG. 2B, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes may not be shared with other pairs of nodes. A host may access data stored on a BE PD through the node pair associated with or attached to the PD.

In at least one embodiment, each pair of nodes provides a dual node architecture where both nodes of the pair may be identical in terms of hardware and software for redundancy and high availability. Consistent with other discussion herein, each node of a pair may perform processing of the different components (e.g., FA, DA, and the like) in the data path or I/O path as well as the control or management path. Thus, in such an embodiment, different components, such as the FA, DA and the like of FIG. 1, may denote logical or functional components implemented by the one or more processors of each node. Each node of the pair may include its own resources such as its own processors, memory, cache and the like, used for exclusively by the node.

As noted above, a data storage system may perform one or more data reduction services or operations such as data deduplication. Effectively performing data reduction is an important capability of a data storage system in order to efficiently utilize physical storage such as of the BE PDs of each pair of nodes. The data reduction may be measured using a data reduction ratio (DRR). For example, 100 MBs (megabytes) of original data may be reduced to 10 MBs as a result of data reduction processing. In this case the DRR is 10:1 denoting a ratio of the original size of the data before data reduction processing with respect to the resulting reduced size of the data after data reduction processing.

The overall DRR achieved with respect to an appliance depends on the amount of identical data blocks stored on the different LUNs of the appliance. To illustrate, consider 2 LUNs, LUN A and LUN B, both configured from BE PDs of the same data storage appliance such as a dual node appliance as illustrated in FIG. 2B. If LUN A is an exact duplicate containing the same content as LUN B, the DRR is 2:1 or 50% for each LUN. Assume that data reduction is performed independently for each dual node appliance where, for example, data deduplication detects duplicate data blocks within the same dual node appliance but not across multiple appliances. If LUN A is now moved to another appliance different from LUN B, the storage capacity reduction achieved by storing LUN A and LUN B on the same appliance may be lost.

Additionally, within the same dual node appliance, it may be beneficial to have the same single node further service I/Os directed to both LUN A and LUN B to avoid the additional overhead and contention that may otherwise be incurred, for example, when one node services I/Os for LUN A and the other node services I/Os for LUN B. Such additional overhead and contention may occur as a result of the need for each node to access the same metadata and other structures due to the fact that LUN A and LUN B both contain the same content. For example, locks or other synchronization techniques may be used to synchronize access to the shared metadata and other structures used by both nodes. Such locks and the inter-node communication needed for synchronization use additional resources of the system. Thus, assigning both LUN A and LUN B to the same single node, whereby the same node services I/Os for both LUN A and LUN B, avoids the foregoing additional overhead and contention.

In such an environment, the decision of how to place or move LUNs across appliances and nodes can have a significant impact on cross-LUN or cross-volume deduplication. Thus, it may be desirable to have a measurement or metric regarding the deduplication between LUNs. However, the cost in space and time to explicitly measure the deduplication between LUNs can be prohibitive. For example, the actual amount of duplicate data between two LUNs may be determined by comparing the actual data content of two LUNs. As a variation, hashes generated from the data content of the two LUNs may be compared to provide an estimate regarding the number of duplicate data blocks. However, as noted above, comparison of either the actual data or hashes to determine cross-volume deduplication undesirably expends additional resources, both in space and time.

Described in the following paragraphs are techniques that may be used to provide an accurate estimation of the deduplication achieved with respect to two LUNs or volumes. Although the following paragraphs may provide examples using the techniques herein with respect to two LUNs, more generally, the techniques herein may be used to provide an estimate regarding the deduplication expected with respect to two data sets where each data set may include one or more storage objects such as LUNs or volumes. The techniques herein may be used to provide the desired estimate regarding mutual deduplication (dedupe) similarity with respect to two LUN or volume families, denoted as V1 and V2. The estimated mutual dedupe similarity with respect to V1 and V2 may be used to estimate the number of identical blocks as between V1 and V2. V1 may include one or more LUNs and V2 may include one or more LUNs different than V1. The techniques herein may be used to provide an accurate estimation regarding the number blocks of V1 that are duplicates with respect to blocks of V2 in a space-efficient and time-efficient manner. Such deduplication estimates may be used generally in connection with placement, location and movement of V1 and V2.

The foregoing and other aspects of the techniques herein are described in more detail in the following paragraphs.

In at least one embodiment in accordance with the techniques herein, a non-cryptographic hashing algorithm or function may be used to compute the hashes of data blocks, where the hashes are used in connection with data deduplication. In at least one embodiment, the hashing algorithm known as xxHash may be used to generate the hashes, where xxHash is a non-cryptographic hashing algorithm. In at least one embodiment, the hashes may be 8 or 16 bytes in size although any suitable size hash value and any suitable hash function may be used. For each LUN or volume, the data storage system may maintain an index that is a list of hashes associated with the blocks stored on that LUN or volume. A global index, such as a hash table described herein, may also be maintained which is the collective index of all hashes for all data blocks in the system among all the LUNs. The range of index values of the hash table may denote the range of hash values that may possibly be generated by the hash function for a data block. Consistent with discussion elsewhere herein, when a new candidate block is processed, its hash is computed and the global index, such as the hash table, is searched for an existing target block having an associated hash that matches the computed hash for the candidate block. If a match is found, processing proceeds with comparing the candidate block with the existing target block. If the candidate and target blocks are identical then the candidate block may be deduplicated rather explicitly store the candidate block. Rather than store the candidate block, processing may use a reference or pointer to the existing target block such as in connection with the full list of hashes for the data blocks stored on the LUN. The hash of the candidate block (which is also the hash of the matching target block) may be added to the LUN's list of hashes associated with blocks stored on the LUN. Additionally, metadata, such as a reference count for the existing target block, is incremented to denote the additional reference to the existing target block. In at least one embodiment, each unique stored data block or target block may have associated metadata including a reference count denoting the number of times the target block is referenced and occurs in stored data. The reference count may be used, for example, for bookkeeping, garbage collection, and possibly other processing performed in an embodiment.

An embodiment in accordance with the techniques herein may create and utilize a new sample index for each LUN or volume. With reference to the element 301 of FIG. 3, generally, the entire range of hashes that may be possibly be generated for data blocks may be from H0 to Hmax, inclusively, where H0 denotes the minimum of the range and Hmax denotes the maximum of the range. Put another way, the hash table as described herein such as in FIG. 2A may have associated indices ranging from H0 to Hmax. The sample index, also referred to herein as the dedupe sample index (DSI), is associated with a selected subset or subrange of the entire range of hash values H0-Hmax. The selected subset or subrange of hashes associated with the DSI may be an ordered subset or contiguous subrange of hash values. An embodiment may select the subset to include hash values in the subrange H1-H2, where H1 denotes the minimum of the subrange and H2 denotes the maximum of the subrange. For example, with reference to 301 of FIG. 3, an embodiment may select A1 as the subrange of hash values H1-H2 to correspond to an uppermost portion of the entire hash value range. As another example with reference to 301 of FIG. 3, an embodiment may alternatively select B1 as the subrange of hash values H1-H2 to correspond to the lower most portion of the entire hash value range.

Figure 3:
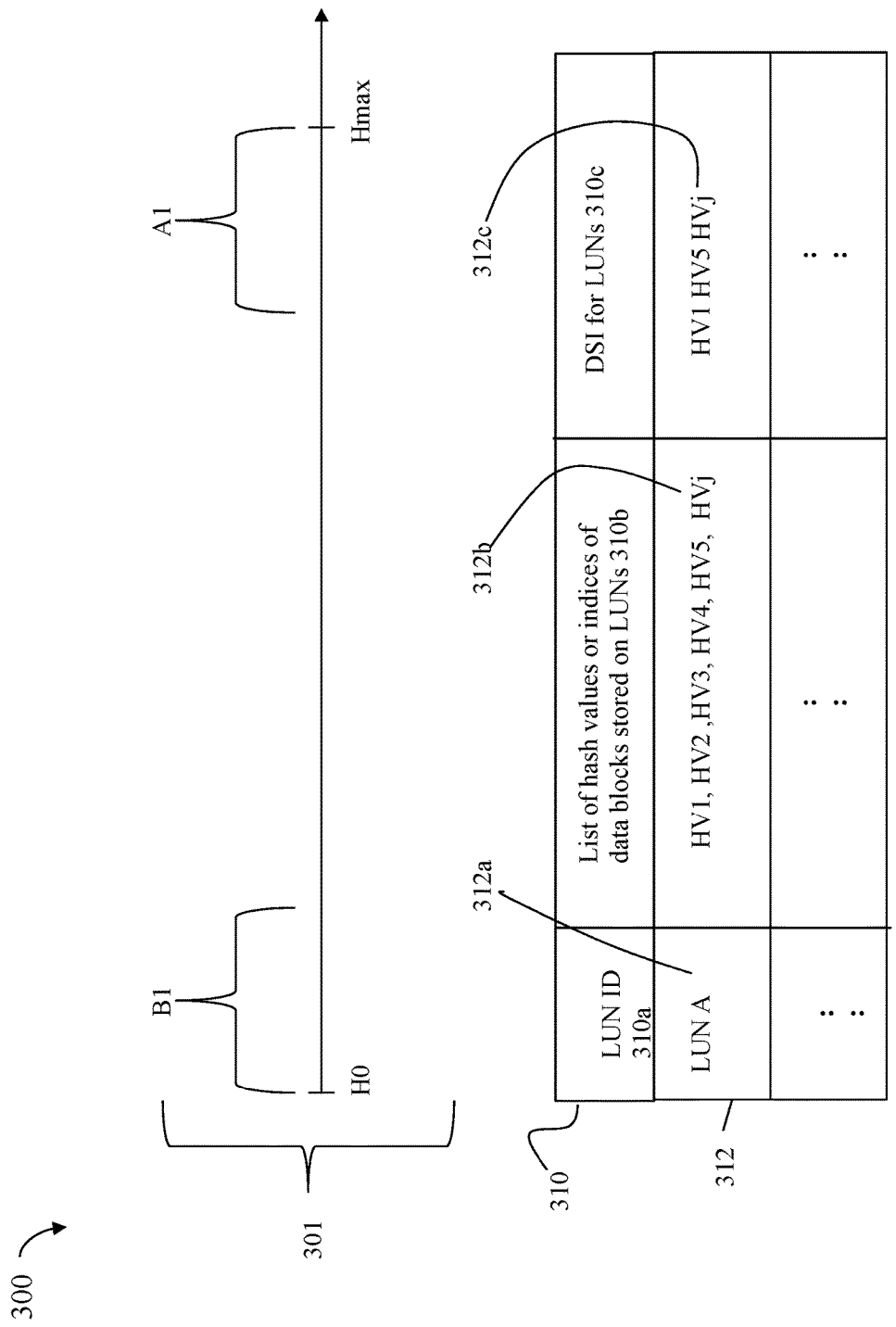
FIG. 3 is an example illustrating different possible subranges for deduplication sampling indices and illustrating a table of information that may be used in an embodiment in accordance with the techniques herein.

Generally, the element FIG. 3 illustrates selecting the subset or subrange of hash values H1-H2 for the DSI to be at the uppermost A1 or lowermost B1 end of the hash value range. More generally, the subset or subrange may be any contiguous subrange of hash values that are not necessarily constrained to the uppermost or lowermost end of the hash value range.

The number of hashes in the subrange A1 or B1 for the DSI may be selected as desired such as, for example, based on a percentage of the total number of hashes in the entire hash range H0-Hmax. For example, an embodiment may select the number of hashes in the subrange of the DSI to be $1/10^k$ of the entire range of hash values H0-Hmax, where K is an integer greater than or equal to 1. Assuming the hash function generates hash values that are sufficiently randomly distributed across the entire hash range and approximate a uniform distribution with a sufficiently low chance of hash collision, then the subrange of the DSI for a LUN or volume effectively denotes a random sample of the data blocks stored on the LUN or volume. For each LUN or volume, a DSI may be determined that includes the hashes or indices of those blocks stored on the LUN which also fall into the specified subrange of the DSI. When a new data block X1 is stored on a LUN, the data block's associated hash value V1 is added to the DSI for the LUN only if V1 falls in the specified subrange H1-H2 associated with the DSI. For example, assume that the DSI has an associated subrange of hash values from 0 through 100, inclusively. If a new data block is stored on the LUN having a hash value of 10, the hash value for the new data block for the LUN is added to the LUN's DSI. If the new data block alternatively has a hash value of 200, the hash value for the new data block for the LUN is not added the LUN's DSI. Similarly, a hash value is deleted from the DSI when the corresponding data block for the hash value is deleted from the LUN.

The table 310 generally represents information that may be generated and used in an embodiment in accordance with the techniques herein. The table 310 includes a first column 310a of LUN IDs (identifiers) where each LUN is uniquely identified with an associated LUN ID, a second column 310b including complete lists of hash values or indices of all the data blocks stored on the LUNs listed in the first column, and a third column 310c of DSIs for the LUNs listed in the first column. Each row of the table may identify the complete list of hash values 310b and the hash values of the DSI 310c for a particular LUN 310a. For example, the row 312 indicates that for the LUN A 312a, the complete list of hash values 312b includes the hash values for all data blocks stored on LUN A, and the DSI 312c for LUN A includes the hash values for the data blocks in the subrange of hash values for the DSI. The hash values of 312c is a subset of the hash values included in the complete list 312b. In a similar manner, a row may be included in the table 310 for each LUN in the system. In at least one embodiment, the DSIs in the column 310c may be determined from existing lists of hash values 310b for the LUNs where the DSI for each LUN may be generated to include the hash values of 310b within the specified subrange of the DSI. New hashes associated with data blocks stored on a LUN may be added to both the list 310b for the LUN and the DSI 310c for the LUN as new data blocks are stored on the LUN. The hash Hnew of a new data block stored on the LUN, such as LUN A, may be added to the list 312b and, if the Hnew is within the subrange associated with the DSI 310c, the hash Hnew is also added to the DSI 312c An embodiment in accordance with the techniques herein may estimate the mutual dedupe similarity (MDS) between two LUNs or volume families, V1 and V2, denoting the expected number of identical blocks (e.g., the number of blocks stored on V1 that match or are identical to blocks stored on V2). The MDS between V1 and V2 may be determined using: the sizes of V1 and V2 (e.g., where the sizes denote the number of data blocks stored on V1 and V2); and the Jaccard Similarity, J, between the DSIs of V1 and V2. The sizes of V1 and V2 may be determined using information in the column 310b of the table 310. For example, V1 is a first LUN having a first corresponding row R1 of information in the table 310 and V2 is a second LUN having a second corresponding row R2 of information in the table 310, then the number of data blocks in the complete list 310b of the first corresponding row R1 may denote the size of V1, and the number of data blocks in the complete list 310b of the second corresponding row R2 may denote the size of V2.

Letting A denote the DSI for V1 and B denote the DSI for V2, then J(A,B) denotes the Jaccard Similarity between the DSIs of V1 and V2. The Jaccard Similarity is generally a real number within the inclusive range [0-1]. J(AB) may be calculated as in EQUATION 1 below:

$$J(A, B) = \frac{|A \cap B|}{|A \cup B|} = \frac{|A \cap B|}{|A| + |B| - |A \cap B|} \quad \text{EQUATION 1}$$

where $\cap$ denotes the set intersection operation;

$\cup$ denotes the set union operation;

| | denotes the size of operation;

|A∩| denotes the size or number of blocks in the intersection of A and B;

|A∪B| denotes the size or number of blocks in the union of A and B;

|A| denotes the size or number of blocks having hashes in A (e.g., the number of data blocks having hashes included the DSI for V1); and

|B| denotes the size or number of blocks having hashes in B (e.g., the number of data blocks having hashes included in the DSI for V2).

The Jaccard Similarity J with respect to A and B denotes a measurement of the similarity of A and B regarding the number of data blocks of A that are identical to data blocks of B. J(A,B) has a value of 0 when there are no identical or duplicate blocks in A and B (e.g., there is no overlap between data blocks of A and B where no block in A matches a block of B). J(A,B) has a value of 1 when A and B have complete overlap and contain the same data blocks (e.g., each block in A matches a block of B). Thus, the higher the value for J, the higher the expected number of identical or matching blocks and the more similar the two populations or sets of A and B. In one aspect, J(A,B) denotes a number in the inclusive range [0,1] that may be converted to a percentage denoting an expected percentage of deduplication with respect to V1 and V2.

With reference to the table 310, each of |A| and |B|, respectively, for a particular V1 and V2 may be determined using corresponding DSIs in the column 310c for rows of the table 310 for V1 and V2. As a further example with reference to the row 312 of the table 310, assume that V1 is the LUN A, then |A| representing the size of the DSI for LUN A is 3 denoted by the 3 HVs in the cell 312c.

The MDS for V1 and V2 may now be expressed as in EQUATION 2:

$$MDS(V1,V2)=J(A,B)*MIN(|V1|,|V2|) \quad \text{EQUATION 2}$$

where

J(A,B) denotes the Jaccard similarity as in EQUATION 1;

* is the multiplication operator;

MIN denotes the minimum operator that returns the minimum of its arguments;

MIN (|V1|, |V2|) denotes the minimum of the sizes of V1 and V2. The sizes of V1 and V2 may be in number of blocks. The size of V1 may denote the number of data blocks stored in V1 and the size of V2 may denote the number of data blocks stored in V2. As a further example with reference to the row 312 of the table 310, assume that V1 is the LUN A, then |V1| representing the size of LUN A in terms of the number of data blocks stored on the LUN A is 6 denoted by the 3 HVs in the cell 312b.

Generally, the MDS noted above provides an estimate regarding the expected number of identical blocks on V1 and V2. An embodiment may more generally express the MDS using any suitable size unit.

The foregoing example illustrates an instance where V1 is a single LUN or volume and V2 is a different single volume or LUN. More generally, V1 and V2 may denote volume sets where V1 is a first set of multiple volumes or LUNs and V2 is a second set of multiple volumes or LUNs. In the case where the techniques herein use EQUATION 2 to estimate the number of identical blocks between V1 and V2 where V1 and V2 each include multiple LUNs or volumes, A denotes the union of the DSI entries for all LUNs in V1, and B denotes the union of the DSI entries for all LUNs in V2. Similarly, in EQUATION 2, the size of V1, |V1|, denotes the collective size of all data blocks with respect to all LUNs in V1, and the size of V2, |V2|, denotes the collective size of all data blocks with respect to all LUNs in V2.

Generally, any suitable size may be selected for the subrange of index values of the DSI used for V1 and V2. What will now be described in more detail is how an embodiment may perform processing to select a size of the subrange of hash values of the DSI.

As a first step S1, processing may select multiple candidate sizes for the subrange of hash values of the DSI. Put another way, the candidate sizes may denote different index sizes being evaluated for the DSI. Following the step S1, the step S2 may be performed for each LUN or volume to generate a candidate DSI index of hash values of the LUN for each of the multiple candidate sizes. For example, in at least one embodiment, the step S1 may select 3 candidate sizes of 10% having $DSI_{10}$, 1% having $DSI_{100}$, and 0.1% having $DSI_{1000}$, which denote percentages of the entire hash range value H0-Hmax. In particular:

a. $DSI_{10}$ is an index having an associated subrange of hash values with a size that is $1/10^{th}$ of the entire hash range H0-Hmax.

b. $DSI_{100}$ is an index having an associated subrange of hash values with a size that is 1/100th of the entire hash range H0-Hmax.

b. $DSI_{1000}$ is an index having an associated subrange of hash values with a size that is 1/1000th of the entire hash range H0-Hmax.

In at least one embodiment, the step S2 may include generating each of the 3 candidate DSIs—$DSI_{10}$, $DSI_{100}$ and $DSI_{1000}$—for each LUN in multiple ways, such as 2 different ways. Thus, the step S2 in this example includes generating 6 candidate DSIs for each LUN in the system. For example, in at least one embodiment, the 3 candidate DSIs—. $DSI_{10}$, $DSI_{100}$ and $DSI_{1000}$—may be generated in a first way by examining a specified number of leading bits (e.g., most significant bits or MSBs) of the hash values of the blocks of each LUN; and the 3 candidate DSIs—$DSI_{10}$, $DSI_{100}$ and $DSI_{1000}$—may be generated in a second way by examining a specified number of trailing bits (e.g., least significant bits or LSBs) of the hash values of the blocks of each LUN. The hash values selected for each of the 3 candidate DSIs generated using the first way may be constrained to have a first particular value denoted by the bit pattern in the specified number of leading bits of each hash value. The hash values selected for each of the 3 candidate DSIs generated using the second way may be constrained to have a second particular value denoted by the bit pattern in the specified number of trailing bits in each hash value. The number of leading bits M1 used for a particular DSI may be based on the index size of the subrange of the DSI, where the index size is a value in the inclusive range of values from 0 to $2^{M1}$. Similarly, the number of trailing bits M2 used for a particular DSI may be based on the index size of the subrange of the DSI, where the index size is a value in the inclusive range of values from 0 to $2^{M2}$. Thus, selection of the hash values included in each of the 6 DSIs varies the particular bit positions and particular values. For a particular DSI having an associated candidate index size, if the hash function generates sufficiently random hash values that approximate a uniform distribution, there should not be much variation or difference (e.g., within a specified tolerance or threshold) between a first MDS determined for the DSI using the trailing bits constrained to one value, and a second MDS determined for the DSI using the leading bits constrained to another value. Thus, in one aspect, the robustness of the hash function used may be evaluated in as described elsewhere herein (e.g., in connection with the step S3) where hashes are selected for the different DSIs by varying the particular hash bits used for selection and additionally varying the particular value to which the selected hashes are constrained.

To further illustrate, consider the first way noted above using leading or MSBs of hash values of data blocks stored on a LUN or volume V1. The $DSI_{10}$, may be generated in the first way by examining a specified number of leading bits, such as the leading 10 bits of each hash value associated with a data block stored on V1. The subrange associated with $DSI_{10}$ includes 10% (i.e., 1/10th) of the hash values of the entire hash range H0-Hmax. Let K1 denote the value of the bit pattern of the leading 10 bits of each hash value. The subrange of the hash values associated with $DSI_{10}$ includes those hash values where (K1 mod 10) is equal to N1, where N1 is a selected or specified integer in the range 0 through 9, inclusively. In the foregoing, "mod" denotes the mathematical modulus function that returns the remainder of a division operation. (K1 mod 10) divides K1 by 10 and returns the remainder as the result of the mod operation. When the result is equal to the selected integer N1, the hash value used to generate the result is included in the subrange associated with the index $DSI_{10}$. In this manner, the subrange associated with the index $DSI_{10}$ includes 10% of the hash values of the entire hash range H0-Hmax. The hash values having data blocks stored on V1 may be processed to determine whether to include each such hash value HV in the index $DSI_{10}$ for V1. The hash value HV for a data block of V1 is included in the index $DSI_{10}$ if the HV has an associated K1 where (K1 mod 10)=N1, the selected integer. For example, the specified integer N1 may be 7 and the hash HV for a data block stored on V1 is included the index $DSI_{10}$ when the HV has an associated K1 where (K1 mod 10)=7.

Consider the first way noted above using leading or MSBs of hash values of data blocks stored on V1 when generating $DSI_{100}$. The $DSI_{100}$, may be generated in the first way by examining a specified number of leading bits, such as the leading 10 bits of each hash value associated with a data block stored on V1. The subrange associated with $DSI_{100}$ includes 1% (i.e., 1/100th) of the hash values of the entire hash range H0-Hmax. Let K1 denote the value of the bit pattern of the leading 10 bits of each hash value as described above. The subrange of the hash values associated with $DSI_{100}$ includes those hash values where (K1 mod 100) is equal to N2, where N2 is a selected or specified integer in the range 0 through 99, inclusively. (K1 mod 100) divides K1 by 100 and returns the remainder as the result of the mod operation. When the result is equal to the selected integer N2, the hash value used to generate the result is included in the subrange associated with the index $DSI_{100}$. In this manner, the subrange associated with the index $DSI_{100}$ includes 1% of the hash values of the entire hash range H0-Hmax. The hash values having data blocks stored on V1 may be processed to determine whether to include each such hash value HV in the index $DSI_{100}$ for V1. The hash value HV for a data block of V1 is included in the index $DSI_{100}$ if the HV has an associated K1 where (K1 mod 100)=N2, the selected integer. For example, the specified integer N2 may be 7 and the hash HV for a data block stored on V1 is included the index $DSI_{100}$ when the HV has an associated K1 where (K1 mod 100)=7.

Consider the first way noted above using leading or MSBs of hash values of data blocks stored on V1 when generating $DSI_{1000}$. The $DSI_{100}$, may be generated in the first way by examining a specified number of leading bits, such as the leading 10 bits of each hash value associated with a data block stored on V1. The subrange associated with $DSI_{1000}$ includes 0.1% (i.e., 1/1000th) of the hash values of the entire hash range H0-Hmax. Let K1 denote the value of the bit pattern of the leading 10 bits of each hash value as described above. The subrange of the hash values associated with $DSI_{1000}$ includes those hash values where (K1 mod 1000) is equal to N3, where N3 is a selected or specified integer in the range 0 through 999, inclusively. (K1 mod 1000) divides K1 by 1000 and returns the remainder as the result of the mod operation. When the result is equal to the selected integer N3, the hash value used to generate the result is included in the subrange associated with the index $DSI_{1000}$. In this manner, the subrange associated with the index $DSI_{1000}$ includes 0.1% of the hash values of the entire hash range H0-Hmax. The hash values having data blocks stored on V1 may be processed to determine whether to include each hash value HV in the index $DSI_{1000}$ for V1. The hash value HV of a data block stored on V1 is included in the index $DSI_{1000}$ if the HV has an associated K1 where (K1 mod 1000)=N3, the selected integer. For example, the specified integer N3 may be 7 and the hash HV for a data block stored on V1 is included the index $DSI_{1000}$ when the HV has an associated K1 where (K1 mod 1000)=7.

Consider the second way noted above using trailing or LSBs of hash values of data blocks stored on V1. The $DSI_{10}$, may be generated in the second way by examining a specified number of trailing bits, such as the trailing 10 bits of each hash value associated with a data block stored on V1. The subrange associated with $DSI_{10}$ includes 10% (or $\frac{1}{10}^{th}$) of the hash values of the entire hash range H0-Hmax. Let K2 denote the value of the bit pattern of the trailing 10 bits of each hash value. The subrange of the hash values associated with $DSI_{10}$ includes those hash values where (K2 mod 10) is equal to N4, where N4 is a selected or specified integer in the range 0 through 9, inclusively. (K2 mod 10) divides K2 by 10 and returns the remainder as the result of the mod operation. When the result is equal to the selected integer N4, the hash value used to generate the result is included in the subrange associated with the index $DSI_{10}$. In this manner, the subrange associated with the index $DSI_{10}$ includes 10% of the hash values of the entire hash range H0-Hmax. The hash values having data blocks stored on V1 may be processed to determine whether to include each hash value HV in the index $DSI_{10}$ for V1, where the hash value HV is included in the index $DSI_{10}$ if the HV has an associated K2 where (K2 mod 10)=N4, the selected integer. For example, the specified integer N4 may be 3 and the hash HV for a data block stored on V1 is included the index $DSI_{10}$ when the HV has an associated K2 where (K2 mod 10)=3.

Consider the second way noted above using trailing or LSBs of hash values of data blocks stored on V1 when computing $DSI_{100}$ using the second way. The $DSI_{100}$, may be generated in the second way by examining a specified number of trailing bits, such as the trailing 10 bits of each hash value associated with a data block stored on V1. The subrange associated with $DSI_{100}$ includes 1% (or $\frac{1}{100}^{th}$) of the hash values of the entire hash range H0-Hmax. Let K2 denote the value of the bit pattern of the trailing 10 bits of each hash value as above. The subrange of the hash values associated with $DSI_{100}$ includes those hash values where (K2 mod 100) is equal to N5, where N5 is a selected or specified integer in the range 0 through 99, inclusively. (K2 mod 100) divides K2 by 100 and returns the remainder as the result of the mod operation. When the result is equal to the selected integer N5, the hash value used to generate the result is included in the subrange associated with the index $DSI_{100}$. In this manner, the subrange associated with the index $DSI_{100}$ includes 1% of the hash values of the entire hash range H0-Hmax. The hash values having data blocks stored on V1 may be processed to determine whether to include each hash value HV in the index $DSI_{100}$ for V1, where the hash value HV is included in the index $DSI_{100}$ if the HV has an associated K2 where (K2 mod 100)=N5, the selected integer. For example, the specified integer N5 may be 3 and the hash HV for a data block stored on V1 is included the index $DSI_{100}$ when the HV has an associated K2 where (K2 mod 100)=3.

Consider the second way noted above using trailing or LSBs for hash values of data blocks stored on V1 when computing $DSI_{1000}$ using the second way. The $DSI_{1000}$, may be generated in the second way by examining a specified number of trailing bits, such as the trailing 10 bits of each hash value associated with a data block stored on V1. The subrange associated with $DSI_{1000}$ includes 0.1% (i.e., $\frac{1}{1000}$th) of the hash values of the entire hash range H0-Hmax. Let K2 denote the value of the bit pattern of the trailing 10 bits of each hash value as above. The subrange of the hash values associated with $DSI_{1000}$ includes those hash values where (K2 mod 1000) is equal to N6, where N6 is a selected or specified integer in the range 0 through 999, inclusively. (K2 mod 1000) divides K2 by 1000 and returns the remainder as the result of the mod operation. When the result is equal to the selected integer N6, the hash value used to generate the result is included in the subrange associated with the index $DSI_{1000}$. In this manner, the subrange associated with the index $DSI_{1000}$ includes 0.1% (i.e., $\frac{1}{1000}$th) of the hash values of the entire hash range H0-Hmax. The hash values having data blocks stored on V1 may be processed to determine whether to include each hash value HV in the index $DSI_{1000}$ for V1, where the hash value HV is included in the index $DSI_{1000}$ if the HV has an associated K2 where (K2 mod 1000)=N6, the selected integer. For example, the specified integer N6 may be 3 and the hash HV for a data block stored on V1 is included the index $DSI_{1000}$ when the HV has an associated K2 where (K2 mod 1000)=3.

As a variation to the foregoing, an embodiment may select different candidate sizes in the step S1 than as noted above. For example, an embodiment may select candidate index sizes for the subrange of hash values of the DSI that are powers of 2 rather than as noted above to allow for use of more efficient bit-wise operations. To further illustrate, rather than select candidate index sizes that are $\frac{1}{10}^{th}$, $\frac{1}{100}^{th}$ and $\frac{1}{1000}^{th}$ of the entire hash range Ho-Hmax, the step S1 may select 3 the following candidate sizes for the DSIs:

a. $DSI_{16}$ is an index having an associated subrange with a size that is $\frac{1}{16}^{th}$ of the entire hash range H0-Hmax.

b. $DSI_{128}$ is an index having an associated subrange with a size that is $\frac{1}{128}^{th}$ of the entire hash range H0-Hmax.

b. $DSI_{1024}$ is an index having an associated subrange with a size that is $\frac{1}{1024}^{th}$ of the entire hash range H0-Hmax.

Using the above second set of DSI sizes having the respective associated DSIs of $DSI_{16}$, $DSI_{128}$ and $DSI_{1024}$, bit masks may be used for efficiently selecting hash values for data blocks stored on V1 and V2 to include in different DSIs. Such an embodiment may generate 6 DSIs using two different approaches or ways such as generally noted above. In particular, rather than use the first and second ways noted above in connection with S2, an embodiment may alternatively use a third and fourth approach or way in the step S2. The third approach or way may be used where the hash values selected for each of the 3 candidate DSIs—$DSI_{16}$, $DSI_{128}$ and $DSI_{1024}$—may be constrained to have a particular value denoted by the bit pattern in a specified number of leading bits. The number of leading bits may be based on the index size, where if the index size is $2^M$, at least M leading bits are used. Additionally, the fourth approach or way may be used where the hash values selected for each of the 3 candidate DSIs—$DSI_{16}$, $DSI_{128}$ and $DSI_{1024}$—may be constrained to have a particular value denoted by a bit pattern in a specified number of trailing bits. The number of trailing bits may be based on the index size, where if the index size is $2^M$, at least M trailing bits are used. In the third and fourth ways, bit masks may be used for efficient sampling or selection of hash values for data blocks of V1 and V2 for the different 6 candidate DSIs.

To further illustrate, consider the third way noted above using leading or MSBs of hash values of data blocks stored on V1. The $DSI_{16}$, may be generated in the third way by examining a specified number of leading bits of a hash value, such as at least the leading 4 bits of each hash value associated with a data block stored on V1, and determining whether the at least leading 4 bits of the hash value matches a particular specified bit pattern, such as "1010" denoting one of the possible 16 bit patterns. For example, assume 4 leading bits are used and assume for simplicity that the HV is 8 bits and has a bit representation of "1010 1111". A bit mask may be used where the 4 leading bits have the specified bit pattern "1010" with the remaining 4 bit positions in the mask being any value of 0 or 1. The bit mask may then be logically XORed (logical exclusive OR operation) with the hash value HV where the resulting bit values in the leading 4 bit positions may be evaluated. The resulting bit values of the 4 leading bit positions will each have a value of 0 if the leading 4 bit positions of HV match the specified pattern of "1010" in the bit mask. To further illustrate, assume the bit mask is "1010 1111" and is logically XORed with the HV="1010 1111". In this case, the result of the foregoing XOR operation is "0000 0000" indicating that the leading 4 bits of the HV match the predetermined bit pattern of "1010".

Consider the third way noted above using leading or MSBs of hash values of data blocks stored on V1 for the $DSI_{128}$. The $DSI_{128}$ may be generated in the third way by examining at least a specified number of leading bits of a hash value, such as at least the leading 7 bits of each hash value associated with a data block stored on V1, and determining whether the at least leading 7 bits of the hash value matches a particular specified bit pattern, such as "0000 000" denoting one of the possible 128 bit patterns. For example, assume 7 leading bits are used and assume for simplicity that the HV is 16 bits and has a bit representation of "1111 1111 1111 1111". A bit mask may be used where the 7 leading bits have the specified bit pattern "0000 000" with the remaining 9 bit positions in the mask being any value of 0 or 1. The bit mask may then be logically XORed (logical exclusive OR operation) with the hash value HV where the resulting bit values in the leading 7 bit positions may be examined. The resulting bit values of the 7 leading bit positions will each have a value of 0 if the leading 7 bit positions of HV match the specified pattern of "0000 000" in the bit mask. To further illustrate, assume the bit mask is "0000 0000 0000 0000" and is logically XORed with HV="1111 1111 1111 1111". In this case, the result of the foregoing XOR operation is "1111 1111 1111 1111" indicating that the leading 7 bits of the HV do not match the predetermined bit pattern of "0000 000".

Consider the third way noted above using leading or MSBs of hash values of data blocks stored on V1 for the $DSI_{1024}$. The $DSI_{1024}$ may be generated in the third way by examining a specified number of leading bits of a hash value, such as at least the leading 10 bits of each hash value associated with a data block stored on V1, and determining whether the at least leading 10 bits of the hash value matches a particular specified bit pattern, such as "0000 0000 00" denoting one of the possible 1024 bit patterns. For example, assume 10 leading bits are used and assume for simplicity that the HV is 16 bits and has a bit representation of "1111 1111 1111 1111". A bit mask may be used where the 10 leading bits have the specified bit pattern "0000 0000 00" with the remaining 6 bit positions in the mask being any value of 0 or 1. The bit mask may then be logically XORed (logical exclusive OR operation) with the hash value HV where the resulting bit values in the leading 10 bit positions may be examined. The resulting bit values of the 10 leading bit positions will each have a value of 0 if the leading 10 bit positions of HV match the specified pattern of "0000 0000 00" in the bit mask. To further illustrate, assume the bit mask is "0000 0000 0000 0000" and is logically XORed with HV="1111 1111 1111 1111". In this case, the result of the foregoing XOR operation is "1111 1111 1111 1111" indicating that the leading 10 bits of the HV do not match the predetermined bit pattern of "0000 0000 00".

Consider the fourth way noted above using trailing or LSBs of hash values of data blocks stored on V1 for the $DSI_{16}$, The $DSI_{16}$ may be generated in the fourth way by examining at least a specified number of trailing bits of a hash value, such as at least the trailing 4 bits of each hash value associated with a data block stored on V1, and determining whether the at least trailing 4 bits of the hash value matches a particular specified bit pattern, such as "1111" denoting one of the possible 16 bit patterns. For example, assume the 4 trailing bits are used and assume for simplicity that the HV is 8 bits and has a bit representation of "1111 1111". A bit mask may be used where the 4 trailing bits have the specified bit pattern "1111" with the remaining 4 bit positions in the mask being any value of 0 or 1. The bit mask may then be logically XORed (logical exclusive OR operation) with the hash value HV where the resulting bit values in the trailing 4 bit positions may be examined. The resulting bit values of the 4 trailing bit positions will each have a value of 0 if the trailing 4 bit positions of HV match the specified pattern of "1111" in the bit mask. To further illustrate, assume the bit mask is "0000 1111" and is logically XORed with HV="1111 1111". In this case, the result of the foregoing XOR operation is "1111 0000" indicating that the trailing 4 bits of the HV match the predetermined bit pattern of "1111".

Consider the fourth way noted above using trailing or LSBs of hash values of data blocks stored on V1 for the $DSI_{128}$, The $DSI_{128}$ may be generated in the fourth way by examining a specified number of trailing bits of a hash value, such as at least the trailing 7 bits of each hash value associated with a data block stored on V1, and determining whether the at least trailing 7 bits of the hash value matches a particular specified bit pattern, such as "1111 111" denoting one of the possible 128 bit patterns. For example, assume 7 trailing bits are used and assume for simplicity that the HV is 16 bits and has a bit representation of "1111 1111 1111 1111". A bit mask may be used where the 7 trailing bits have the specified bit pattern "1111 111" with the remaining 9 bit positions in the mask being any value of 0 or 1. The bit mask may then be logically XORed (logical exclusive OR operation) with the hash value HV where the resulting bit values in the trailing 7 bit positions may be examined. The resulting bit values of the 7 trailing bit positions will each have a value of 0 if the trailing 7 bit positions of HV match the specified pattern of "1111 111" in the bit mask. To further illustrate, assume the bit mask is "1111 1111 1111 1111" and is logically XORed with HV="1111 1111 1111 1111". In this case, the result of the foregoing XOR operation has "0000 0000 0000 0000 where the trailing 7 bits of the HV match the predetermined bit pattern of "1111 111".

Consider the fourth way noted above using trailing or LSBs of hash values of data blocks stored on V1 for the $DSI_{1024}$, The $DSI_{1024}$ may be generated in the fourth way by examining a specified number of trailing bits of a hash value, such as at least the trailing 10 bits of each hash value associated with a data block stored on V1, and determining whether the at least trailing 10 bits of the hash value matches a particular specified bit pattern, such as "1111 1111 11" denoting one of the possible 1024 bit patterns. For example, assume 10 trailing bits are used and assume for simplicity that the HV is 16 bits and has a bit representation of "1111 1111 1111 1111". A bit mask may be used where the 10 trailing bits have the specified bit pattern "1111 1111 11" with the remaining 6 bit positions in the mask being any value of 0 or 1. The bit mask may then be logically XORed (logical exclusive OR operation) with the hash value HV where the resulting bit values in the trailing 10 bit positions may be examined. The resulting bit value of the 10 trailing bit positions will each have a value of 0 if the trailing 10 bit positions of HV match the specified pattern of "1111 1111 11" in the bit mask. To further illustrate, assume the bit mask is "1111 1111 1111 1111" and is logically XORed with HV="1111 1111 1111 1111". In this case, the result of the foregoing XOR operation has "0000 0000 0000 0000 where the trailing 10 bits of the HV match the predetermined bit pattern of "1111 1111 1111 1111".

At this point, the steps S1 and S2 may be performed as described above to generate 6 DSIs for each LUN or volume based on 3 different candidate DSI index sizes (e.g., 3 different sizes for the associated subrange of the hash values for the DSI). Described above are two different variations of the step S2 where each variation uses a different set of 3 DSI index sizes. For purposes of discussion, the following paragraphs may refer to the first set of DSIs—$DSI_{10}$, $DSI_{100}$ and $DSI_{1000}$—rather than the second set of DSIs—$DSI_{16}$, $DSI_{128}$ and $DSI_{1024}$—for illustration of the techniques herein. However, more generally, the following paragraphs and subsequent processing may be performed with respect to the second set of DSIs as well as any suitable set of DSIs using different candidate sizes for the subrange of hash values of the DSIs.

Figure 4:
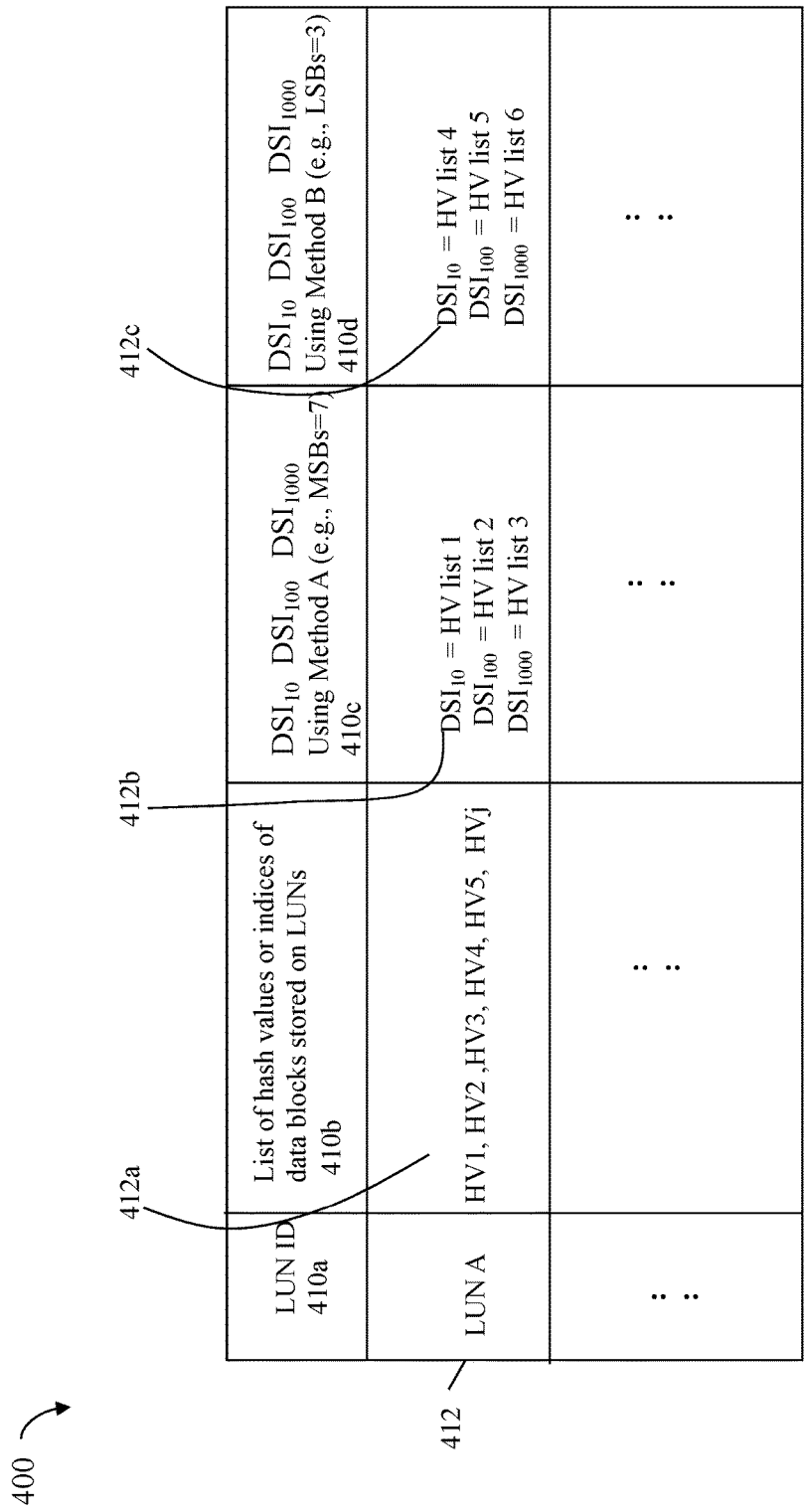
FIGS. 4 and 5 are examples of information that may be generated and used in connection with selecting a size of the subrange associated with the deduplication sampling indices in an embodiment in accordance with the techniques herein.

As a result of performing the steps S1 and S2 as described above using the first set of DSIs—$DSI_{10}$, $DSI_{100}$ and $DSI_{1000}$, 6 DSIs are generated for each LUN or volume. The table 400 of FIG. 4 is an example illustrating information, including the 6 DSIs, that may be stored for each LUN. The table 400 includes a first column 410 of LUN IDs, a second column 410b including the list of hash values or indices of data blocks stored on the LUNs, a third column 410c of the 6 DSIs calculated using method A corresponding the first way noted above where a specified number of MSBs have a value of 7, and a fourth column 410d of the 6 DSIs calculated using method B corresponding to the second way noted above where a specified number of LSBs have a value of 3. The columns 410a-b of FIG. 4 are similar to the columns 310a-b of the table 310 of FIG. 3. The step S2 results in populating information in the columns 410c-d for the LUNs.

Each row of the table 400 includes information for a different LUN. For example, the row 412 indicates that LUN A has the list 412a of hash values of data blocks as denoted in the column 410b. The entry 412b denotes the 3 DSIs generated for LUN A using the method A, where $DSI_{10}$ has an associated hash value (HV) list, HV list 1, of hashes that fall within the subrange of hash values associated with $DSI_{10}$, where $DSI_{100}$ has an associated HV list 2 of hashes that fall within the subrange of hash values associated with $DSI_{100}$, and where $DSI_{1000}$ has an associated HV list 3 of hashes that fall within the subrange of hash values associated with $DSI_{1000}$. The entry 412c denotes the 3 DSIs generated for LUN A using the method B, where $DSI_{10}$ has an associated HV list 4 of hashes that fall within the subrange of hash values associated with $DSI_{10}$, where $DSI_{100}$ has an associated HV list 5 of hashes that fall within the subrange of hash values associated with $DSI_{100}$, and where $DSI_{1000}$ has an associated HV list 6 of hashes that fall within the subrange of hash values associated with $DSI_{1000}$.

The list of LUNs denoted by the column 410a may denote a set of LUNs L1. Using the information in the table 400 of FIG. 4, a third step S3 may be performed between each pair of LUNs or volumes Vi, Vj, that may be formed from the LUNs in the set L1. The third step S3 may include performing the steps S3a and S3b described below with respect to each pair of LUNs or volumes Vi and Vj. Let VMAX denote the number of LUNs in the set L1 and thus rows in the table 400. For each pair of LUNs Vi, Vj, where i ranges from 1 to VMAX, inclusively, and j ranges from 1 to VMAX, inclusively, processing may be performed in the step S3a to count the actual number of identical blocks, and thus the number of deduplicated blocks, between Vi and Vj. Put another way, the step S3a determines the actual number of data blocks of Vi that are identical to data blocks of Vj. Additionally, for each of the 6 DSIs generated for each LUN or volume (e.g., as included in the columns 410c-d of FIG. 4), the step S3b determines the MDS (Vi, Vj) as expressed in EQUATION 2 to determine the estimated dedupe size with respect to Vi and Vj, where the estimated dedupe size denotes the expected number of identical blocks as between Vi1 and Vj.

In at least one embodiment, the step S3a may include reading all the hash values for data blocks stored on Vi and Vj. With reference to FIG. 4, the step S3a includes reading the two lists of hash values for Vi and Vj as stored in the column 410a of the rows corresponding to Vi and Vj. Let R1 denote the first list of all the hash values for data blocks stored on Vi. Let R2 denote the second list of all the hash values for data blocks stored on Vj. Processing may be performed in the step S3a to determine how many hash values on the list R1 have a match on a the second list R2. For each matching pair of hashes where a first hash H1 on the list R1 has a matching hash H2 on the list R2, further compare the associated data blocks to determine whether the data block D1 having the hash H1 is identical to the data block D2 having the hash H2. As a variation, an embodiment may determine the count of the actual number of identical blocks between Vi and Vj based on the number of matching pairs of hash values H1 and H2, where H1 is a hash for the block D1 on Vi, and H2 is a hash for the block D2 on Vj without further comparing the actual data blocks D1 and D2.

In at least one embodiment, the processing of the step S3a may further include evaluating the chance of a hash collision occurrence. Consistent with other discussion herein, a hash collision occurs when two non-identical data blocks have the same hash value. Thus, the step S3a may include tracking the number of times of a hash collision that a block D1 on Vi has a hash H1 that matches a hash H2 of a data block D2 on Vj, but where D1 is not identical to D2. Based on the number of times, HC, that a hash collision is observed in connection with the step S3a for all pairs of volumes, processing may determine the actual probability of a hash collision based on the total number of matching pairs of hash values H1, H2. The foregoing evaluation of the chance of a hash collision occurrence may be used as a measure regarding the quality or strength of the hash function used.

For a pair of volumes Vi, Vj, the step S3b may include determining an expected number of identical blocks as between Vi and Vj (e.g., the expected number of blocks on Vi that are identical to blocks on Vj) for each of the 6 DSIs. For each of the 6 candidate DSIs generated for each LUN or volume (e.g., as included in the columns 410c-d of FIG. 4), the step S3b includes determining the Jaccard Similarity using EQUATION 1. For example, for the $DSI_{10}$ computed using method A, let A denote the $DSI_{10}$ computed using method A for Vi and let B denote the $DSI_{10}$ computed using method A for Vj. J(A,B) as in EQUATION 1 then denotes the Jaccard Similarity between the $DSI_{10}$ computed using method A for Vi and the $DSI_{10}$ computed using method A for Vj. Once J(A,B) is computed for a particular candidate DSI, the step S3b processing may include calculating the MDS for the candidate DSI. The MDS (Vi, Vj) as expressed in EQUATION 2 may be calculated to determine the estimated dedupe size with respect to Vi and Vj, where the estimated dedupe size denotes the expected number of identical blocks as between Vi and Vj for the candidate DSI.

Based on the estimated dedup size determined for the candidate DSI with respect to a pair of volumes Vi, Vj, the step S3b may also include calculating the estimated dedup percentage (%) denoting the percentage of blocks in Vi that are duplicates in Vj with respect to the size of Vi as in EQUATION 3A below:

$$\text{estimated dedup \%}(Vi,Vj)=MDS(Vi,Vj)/|Vi| \quad \text{EQUATION 3A}$$

where

MDS (Vi, Vj) is determined using EQUATION 2 for the candidate DSI; and

|Vi| denotes the size of Vi such as the number of data blocks in Vi.

Based on the estimated dedup size determined for the candidate DSI with respect to a pair of volumes Vi, Vj, the step S3b may also include calculating the estimated dedup percentage (%) denoting the percentage of blocks in Vi that are duplicates in Vj with respect to the size of Vj as in EQUATION 3B below:

$$\text{estimated dedup \% }(Vj,Vi)=MDS(Vi,Vj)/|Vj| \quad \text{EQUATION 3B}$$

where

MDS (Vi, Vj) is determined using EQUATION 2 for the candidate DSI; and

|Vj| denotes the size of Vj such as the number of data blocks in Vj.

Once the foregoing step S3 has been completed, the step S4 may be performed. The step S4 may include reporting information. The information reported may include the number of size of the full range of hash values H0-Hmax. For each LUN, the information reported may include the number of hash values in the list of hash values of data blocks for the LUN (e.g., the number of hash values in the list of column 410b for the LUN), the size of the subrange associated with each of the 6 candidate DSIs, and a ratio for each of the 6 candidate DSIs denoting the size of the DSI subrange with respect to the size of the full range of hash values H0-Hmax (e.g., $\frac{1}{10}$ for the $DSI_{10}$.

Figure 5:
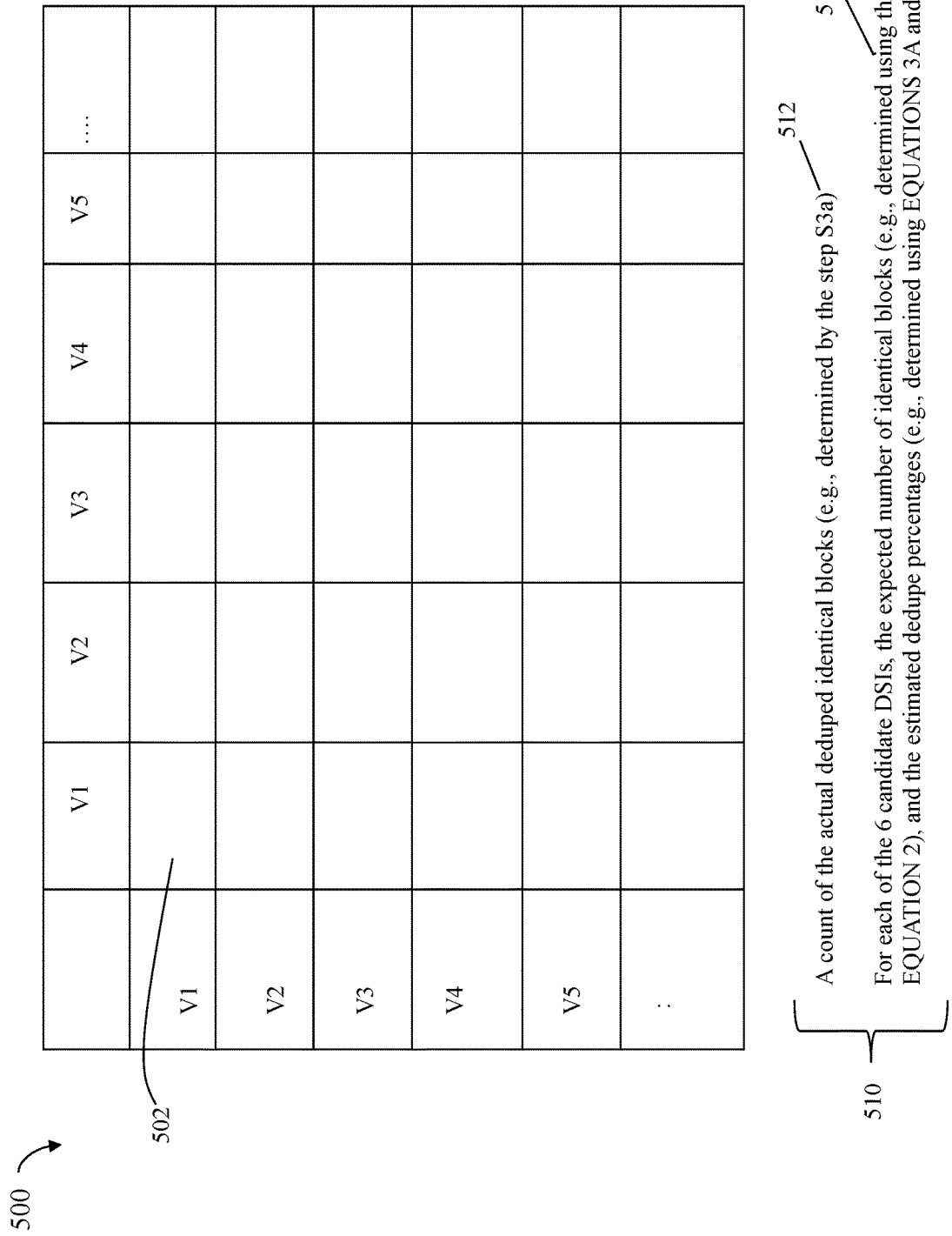

The step S4 may also include generating a matrix or table 500 of information for each pair of volumes Vi, Vj as illustrated in the FIG. 5. Each pair of volumes Vi, Vj, processing in the step S3 has an associated cell in the matrix 500 including information regarding the particular volume pair instance, where i may denote the row of the matrix and j may denote the column of the matrix. Each cell in the matrix for a pair of volumes Vi, Vj may include the information 510 determined in the step S3. The information 510 for the volume pair Vi, Vj may include the count (512) of the actual deduped identical blocks for the volume pair Vi, Vj as determined in the step S3a. The count of the actual deduped identical blocks denotes he actual number of data blocks of Vi that are identical to data blocks of Vj as determined in the step S3a. The information 510 for the volume pair Vi, Vj may include the information of 514 determined for each of the 6 candidate DSIs in the step S3. For each of the 6 candidate DSIs, the information 514 may include the expected number of identical blocks (e.g., determined using the MDS of EQUATION 2), and the estimated dedupe percentages (e.g., determined using EQUATIONS 3A and 3B).

The information in the matrix or table 500 of FIG. 5 may be used to in performing verification or validation processing. The information in the matrix 500 may be examined for internal consistency in one or more ways. For example, all entries on the diagonal of the matrix may be examined. An entry on the diagonal of the matrix is an entry such as denoted by the element 502 for the entry where i=1 and j=1. Generally, the entries on the diagonal of the matrix 500 have indices i, j, where i=j. All entries on the diagonal of the matrix 500 should have 1) an estimated dedup percentages=1 or 100% and 2) an expected number of identical blocks equal to the number data blocks in the LUN or volume (e.g., the volume has a dedupe of 100% with itself). As another example, the estimated number of identical blocks of a first entry for Vi, Vj should be the same as the estimated number of identical blocks of a second entry for Vj, Vi.

The information in the matrix 500 may be used to verify or validate the robustness of the hash function. For example, for a volume pair Vi Vj, its corresponding cell of the matrix 500 may be examined. A first expected number of identical blocks determined for $DSI_{10}$ using the method A may be compared to a second expected number of identical blocks determined for $DSI_{10}$ using the method B. If the hash function is generating hash values that approximate a uniform distribution, the foregoing two expected numbers of identical blocks should be approximately the same or statistically similar, such as within specified tolerances or thresholds. The foregoing may be performed for the $DSI_{10}$, $DSI_{100}$ and $DSI_{1000}$ to compare the expected number of identical blocks determined using the method A and the method B. Generally, the number of expected identical blocks determined for $DSI_{100}$ using method A and method B should be approximately the same or statistically similar, such as within specified tolerances or thresholds; and also the number of expected identical blocks determined for $DSI_{1000}$ using method A and method B should be approximately the same or statistically similar, such as within specified tolerances or thresholds.

The information in the matrix 500 may be used to select a size of the subrange of the DSI index to use in production. For example, the 6 candidate DSIs may be based on 3 candidate sizes as noted above where:

a. $DSI_{10}$ is an index having an associated subrange of hash values with a size that is $\frac{1}{10}^{th}$ of the entire hash range H0-Hmax.

b. $DSI_{100}$ is an index having an associated subrange of hash values with a size that is $\frac{1}{100}^{th}$ of the entire hash range H0-Hmax.

c. $DSI_{1000}$ is an index having an associated subrange of hash values with a size that is $\frac{1}{1000}^{th}$ of the entire hash range H0-Hmax.

Thus, the 3 candidate sizes noted by the $DSI_{10}$, $DSI_{100}$ and $DSI_{1000}$ are: $\frac{1}{10}^{th}$ the size of the entire hash range H0-Hmax, $\frac{1}{100}^{th}$ the size of the entire hash range H0-Hmax, and $\frac{1}{1000}^{th}$ the size of the entire hash range H0-Hmax. Generally, a larger candidate size index, such as denoted by $DSI_{10}$, is expected to have a lower error rate than a smaller candidate size index, such as denoted by $DSI_{100}$ and $DSI_{1000}$. However, the lower error rate of the larger sized DSI has an added cost in terms of storage requirements and management overhead. In at least one embodiment, for each of the 3 different candidate sizes denoted by the $DSI_{10}$, $DSI_{100}$ and $DSI_{1000}$, an error rate may be determined based on the difference between the count of the actual deduped identical blocks (as determined in the step S3a) and the expected number of identical blocks (as determined using the MDS of EQUATION 2). Generally, the less the foregoing difference, the better the estimation determined using the MDS of EQUATION 2. Processing may select a candidate size for the DSI that provides a sufficiently accurate estimation of the expected number of identical blocks between volumes (e.g.

with a 20% margin of error) and whose size does not result in unreasonable overhead. For example, $DSI_{100}$ denotes a candidate size that is $1/100^{th}$ the size of the entire hash range H0-Hmax and may have an associated error rate that is less than a specified threshold. $DSI_{1000}$ denotes a candidate size that is $1/1000^{th}$ the size of the entire hash range H0-Hmax and may have an associated error rate that is more than the specified threshold. $DSI_{10}$ denotes a candidate size that is $1/10^{th}$ the size of the entire hash range H0-Hmax and may have an associated error rate that is also less than the specified threshold. However, the $DSI_{10}$ may have too high of an associated cost in terms of storage and overhead in comparison to the $DSI_{100}$. As a result, an embodiment may select to use $DSI_{100}$ with a candidate size that is $1/100^{th}$ the size of the entire hash range H0-Hmax or full index.

Figure 6:
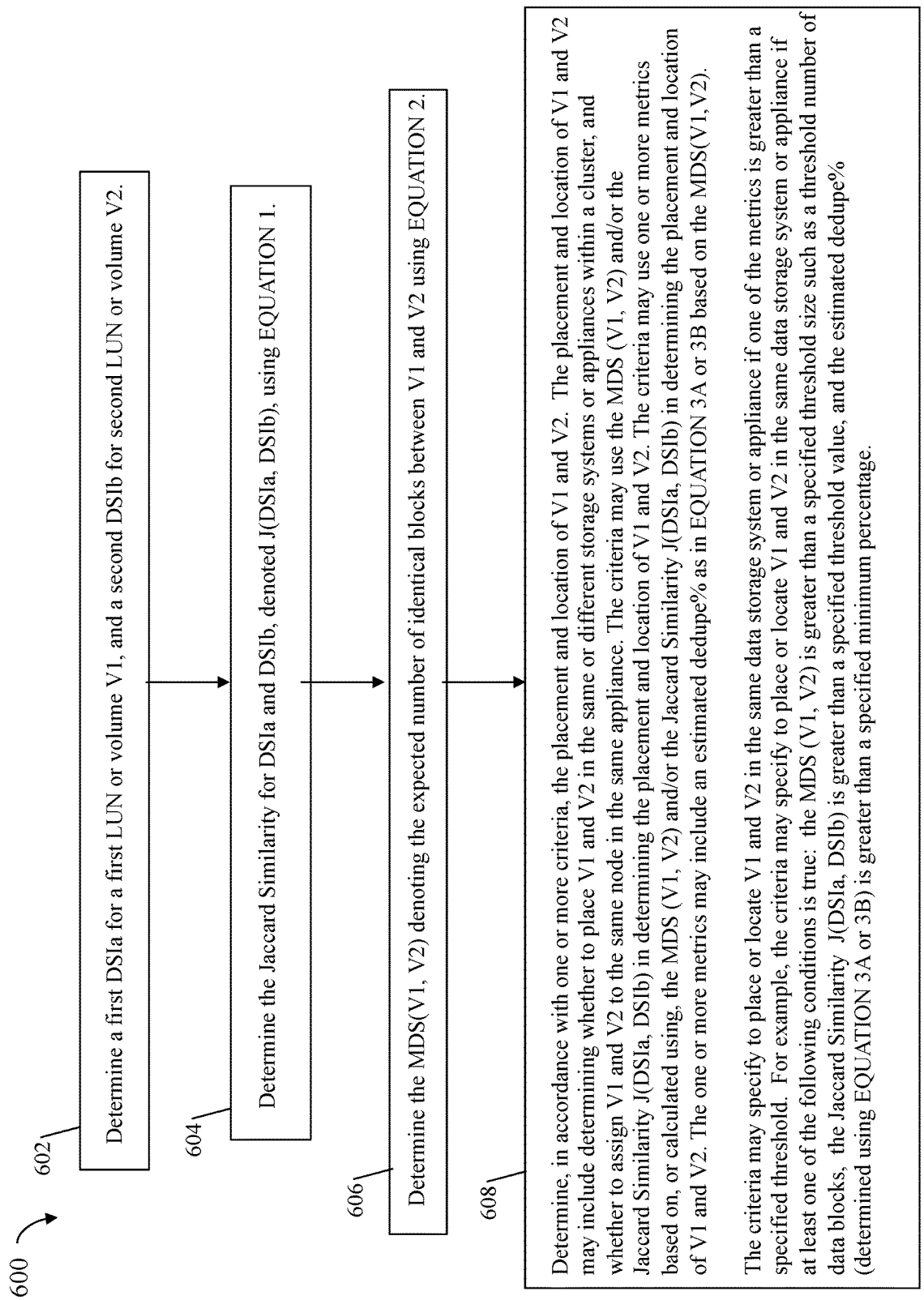
FIG. 6 is a flowchart of processing steps that may be performed in an embodiment in accordance with the techniques herein.

Referring to FIG. 6, shown is a flowchart of processing steps that may be performed in an embodiment in accordance with the techniques herein. Although the steps of 600 are described with respect to two LUNs or volumes, V1 and V2, each of V1 and V2 may correspond more generally to one or more LUNs or volumes as discussed elsewhere herein.

At the step 602, processing is performed to determine two DSIs—a first DSIa for a first LUN or volume V1, and a second DSIb for second LUN or volume V2. The two DSIs are each associated with the same subrange of hash values, where the subrange is a portion of the entire range of possible hash values H0-Hmax (i.e., the subrange is a portion of the full hash index of hashes that may be generated by the hash algorithm). The size or span of the subrange may be any suitable size. An embodiment in accordance with the techniques herein may determine the size or span of the subrange of the two DSIs in any suitable manner. An embodiment in accordance with the techniques herein may select any suitable subrange or portion of the entire range of possible hash values H0-Hmax. In at least one embodiment, the subrange of hash values used for the DSIs may span from a minimum value to a maximum value, where the minimum value and the maximum value selected may be any suitable hashes in the entire range of possible hash values H0-Hmax, and where the distance or difference between the minimum and maximum values corresponds to the selected size for the subrange.

In at least one embodiment, the first DSIa for V1 in the step 602 may be determined by examining the list of hash values of all data blocks stored on V1. If a hash value on the list is within the specified subrange of hash values associated with DSIa, then the hash value is added to the DSIa. In a similar manner, the second DSIb for V2 may be determined in the step 602 by examining the list of hash values of all data blocks stored on V2. If a hash value on the list is within the specified subrange of hash values associated with DSIb, then the hash value is added to the DSIb. As new hashes are generated for new data blocks stored on V1, the new hashes are added to DSIa if within the specified subrange. In a similar manner, new hashes may be added to DSIb for new data blocks written to V2. Hashes may also be removed from DSIa and DSIb as the data blocks used to generate the hashes are deleted, respectively, from V1 and V2. From the step 602, control proceeds to the step 604.

At the step 604, processing is performed to determine the Jaccard Similarity for DSIa and DSIb, denoted J(DSIa, DSIb), using EQUATION 1. From the step 604 control proceeds to the step 606.

At the step 606, processing is performed to determine the MDS(V1, V2) denoting the expected number of identical blocks between V1 and V2 using EQUATION 2. As expressed in EQUATION 2, the MDS(V1, V2) determined in the step 606 uses the Jaccard Similarity J(DSIa, DSIb) determined in the step 604. From the step 606, control proceeds to the step 608.

At the step 608, processing is performed to determine, in accordance with one or more criteria, the placement and location of V1 and V2. The placement and location of V1 and V2 may include determining whether to place V1 and V2 in the same data storage system or appliance, whether to place V1 and V2 in the same data storage system or appliance in different storage systems or appliances within a cluster, and whether to assign V1 and V2 to the same node in the same appliance. The criteria may use the MDS (V1, V2) and/or the Jaccard Similarity J(DSIa, DSIb) in determining the placement and location of V1 and V2. The criteria may use one or more metrics based on, or calculated using, the MDS (V1, V2) and/or the Jaccard Similarity J(DSIa, DSIb) in determining the placement and location of V1 and V2. The one or more metrics may include an estimated dedupe % as in EQUATION 3A or 3B based on the MDS(V1, V2). The one or more metrics may include directly using the Jaccard Similarity J(DSIa, DSIb) or an equivalent percentage thereof to denote an expected percentage of deduplication with respect to V1 and V2.

The criteria may specify to place or locate V1 and V2 in the same data storage system or appliance if one of the metrics is greater than a specified threshold. For example, the criteria may specify to place or locate V1 and V2 in the same data storage system or appliance if at least one of the following conditions is true: the MDS (V1, V2) is greater than a specified threshold size such as a threshold number of data blocks, the Jaccard Similarity J(DSIa, DSIb) or equivalent percentage thereof is greater than a specified threshold value, and the estimated dedupe % (determined using EQUATION 3A or 3B) is greater than a specified minimum percentage.

It should be noted that an embodiment may omit performing the step 606 if the particular criteria used in the embodiment does not utilize the MDS (V1, V2) as determined in the step 606. For example, the one or more criteria used in the step 608 may only use the Jaccard Similarity J(DSIa, DSIb) or equivalent percentage thereof.

Generally, the one or more criteria may use one or more suitable measurements or metrics to determine a degree of similarity or mutual deduplication with respect to V1 and V2. The one or more criteria may be used to evaluate whether V1 and V2 are expected to have a sufficiently high degree of similarity or mutual deduplication and thus expected to have a sufficiently high number or percentage of identical data blocks.

The one or more criteria may be used in any suitable manner to determine location, placement and/or movement of V1 and V2, where such location, placement and/or movement of V1 and V2 may have an impact on performance and/or cross-volume deduplication and thus data reduction.

The following paragraphs provide additional examples illustrating use of the techniques herein to efficiently provide an accurate estimation regarding the expected mutual data deduplication (and thus similarity regarding the data blocks) of V1 and V2. The one or more criteria, such as used in the step 608 and described herein, may be used to measure the expected mutual data deduplication and determine whether the expected mutual data deduplication of V1 and V2 meets one or more conditions of the criteria denoting a sufficient level of similarity (in terms of identical blocks) between V1 and V2.

As a first example, two LUNs or volumes V1, V2 may be determined by the one or more criteria to have an estimated or expected level of mutual data deduplication (and thus similarity) that denotes a sufficiently high degree of similarity. Processing such as in the step 608 may determine that V1 and V2 are expected to have a high amount or percentage of identical blocks and therefore may be located or placed together on the same appliance or data storage system. In particular, the appliance may include node pairs such as described in connection with FIG. 2B, where each appliance or node pair accesses the same set of BE PDs. Data reduction may be performed independently for each dual node appliance where, for example, data deduplication detects duplicate data blocks within the same dual node appliance but not across multiple appliances. Thus, for example, if V1 is a block for block duplicate of V2, and V1 and V2 are stored on the same BE PDs of the same appliance, the achieved data dedupe rate is 50%. If V1 is now moved to another appliance different from V2, the storage capacity reduction achieved by storing V1 and V2 on the same appliance may be lost. Thus, an embodiment may keep V1 and V2 together on the same appliance or otherwise migrate or move V1 and V2 as a pair rather than locate V1 and V2 on different appliances. When a pair of volumes V1 and V2 is estimated or expected to have a large amount or percentage of identical blocks between the volumes, the volume pair may be located or moved together to maintain the storage reduction capacity obtained as a result of deduplication. The volume pair may be moved or migrated between storage appliances in a cluster, for example, in connection with load balancing within the cluster. In at least one embodiment, a load balancing component on the data storage system may receive hints regarding the volume pairs that should be located on the same appliance and thus migrated as needed between appliances as a pair in connection with workload balancing within the cluster.

As another example, within the same dual node appliance, it may be beneficial to have the same single node further service I/Os directed to both V1 and V2 of the volume pair expected or estimated to have a large amount of identical data blocks to avoid the additional overhead and contention that may otherwise be incurred, for example, when one node services I/Os for V1 and the other node services I/Os for V2. The volumes V1, V2 may be estimated or expected to have a high amount or percentage of identical blocks as denoted by the one or more criteria using the techniques herein. Such additional overhead and contention may occur as a result of the need for each node to access the same metadata and other structures due to the fact that both volumes contain the same content. As noted elsewhere herein, locks or other synchronization techniques may be used to synchronize access to the shared metadata and other structures used by both nodes. Such locks and the inter-node communication needed for synchronization use additional resources of the system. Thus, assigning both V1 and V2 to the same single node, whereby the same node services I/Os for both V1 and V2, avoids the foregoing additional overhead and contention. In such an embodiment, the load balancing component may receive hints identifying volume pairs that should be located on, or otherwise have I/Os serviced by, the same node. For example, as noted elsewhere herein, the storage appliance may have an active-active configuration where both nodes may service I/Os from both V1 and V2. There may be a first set of multiple paths from a host to the node A of the storage appliance and second set of multiple paths from the host to the node B of the storage appliance. The host may be able to issue I/Os to both V1 and V2 over both the first set of paths and the second set of paths. Load balancing on the data storage system may, for example, use the hint indicating that V1 and V2 should preferably have their I/Os serviced by the same node. In this case, the load balancing component on the data storage system may indicate that I/Os to both V1 and V2 should be preferably sent on only the first set of paths (and thus serviced only by the preferred node A). The data storage system may provide the host with preferred path information indicating that only the first set of paths are preferred for I/Os to V1 and V2 and the second set of paths are non-preferred (e.g., may be used if no preferred path to the preferred processing node A is active or available). As a variation, the data storage system may provide the host with preferred path information indicating that only the second set of paths are preferred for I/Os to V1 and V2 and the first set of paths are non-preferred (e.g., may be used if no preferred path to the preferred processing node B is active or available). The host may use the preferred path information when selecting a path for sending I/Os to V1 and V2 and may therefore use paths of the preferred path set if available prior to using non-preferred paths to the non-preferred node.

As yet another example, V1 and V2 may be estimated or expected to have a high amount of identical blocks as determined by the one or more criteria using the techniques herein. Information identifying volume pairs V1 and V2 that have an estimated or expected high amount of deduplication may be used in connection with volume replication within the cluster or to a remote location. It may be desirable to have the pair of volumes V1 and V2 located in the same source data storage system or appliance. Additionally, it may be desirable to have V1 and V2 configured for replication to the same target location such as the same target data storage system or appliance. Assuming the target location or system also performs deduplication, the target system may also advantageously achieve the same expected high level of deduplication between the replicated counterparts of V1 and V2. In such an embodiment, information regarding the identified volume pair V1 and V2 having an estimated or expected high amount of deduplication as determined by the one or more criteria may be provided in the form of a hint to the replication facility for use in configuring V1 and V2 for replication. The replication facility may automatically configure V1 and V2 to the same selected target system that performs data deduplication. Also, assuming V1 and V2 are on the same source system, the replication facility may take advantage of the fact that both V1 and V2 have duplicate data when transmitting data from the source system to the target system. For example, the replication facility may determine that the same data block B1 is written to both V1 and V2 where the data block B1 also needs to be written to the replicated copies of the V1 and V2. The replication facility may reduce the data bandwidth consumed for replication. For example, rather than send two instance of the data block B1 over the replication connection to the target system, the replication facility may alternatively only send a single instance of the data block B1 along with additional information indicating that the same data block B1 is stored on both V1 and V2.

While we presented the examples above with two volumes V1 and V2, these techniques can be generalized in a straightforward manner to two sets of volumes $VS_1$ and $VS_2$. In this case the Jaccard similarity will be calculated over the union of the DSI entries for the volumes in $VS_1$ and $VS_2$ respectively. In other words A and B in EQUATION 1 are the union of the DSI entries for the volumes in $VS_1$ and $VS_2$ respectively.

The techniques herein may be performed by any suitable hardware and/or software. For example, techniques herein may be performed by executing code which is stored on any one or more different forms of computer-readable media, where the code may be executed by one or more processors, for example, such as processors of a data storage system, computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of determining and using deduplication estimates comprising:
    determining a first data deduplication sample index (DSI) for a first logical device set of a first plurality of logical devices and a second DSI for a second logical device set of a second plurality of logical devices, wherein the first DSI and the second DSI are each associated with a same subset of hash values included in a range of allowable hash values generated by a hash function for corresponding data blocks, and wherein said determining the first DSI includes:
        determining a first plurality of DSIs corresponding to the first plurality of logical devices, wherein each of the first plurality of logical devices has a corresponding one of the first plurality of DSIs identifying hash values, for data blocks of said each logical device of the first plurality of logical devices, which are in the same subset of hash values; and
        determining the first DSI as a set union of hash values of the first plurality of DSIs; and
    wherein said determining the second DSI includes:
        determining a second plurality of DSIs corresponding to the second plurality of logical devices, wherein each of the second plurality of logical devices has a corresponding one of the second plurality of DSIs identifying hash values, for data blocks of said each logical device of the second plurality of logical devices, which are in the same subset of hash values; and
        determining the second DSI as a set union of hash values of the second plurality of DSIs;
    determining a Jaccard Similarity for the first DSI and the second DSI, wherein the Jaccard Similarity denotes a measurement of similarity and mutual deduplication regarding a number of data blocks of the first logical device set expected to match data blocks of the second logical device set;
    determining, in accordance with one or more criteria, whether the first logical device set and the second logical device set should be located in different data storage systems or a same data storage system that performs data deduplication with respect to data blocks stored on the first logical device set and the second logical device set, wherein the one or more criteria uses the Jaccard Similarity in determining whether to locate the first logical device set and the second logical device set in the same data storage system or the different data storage systems; and
    responsive to determining that the first logical device set and the second logical device set should be located in the same data storage system, locating the first logical device set and the second logical device set in the same data storage system.

2. The method of claim 1, further comprising:
    determining, using the Jaccard Similarity for the first DSI and the second DSI, a number of expected identical data blocks between the first logical device set and the second logical device set, wherein the number of expected identical blocks is determined by multiplying the Jaccard Similarity for the first DSI and the second DSI by a minimum of a number of data blocks stored in the first logical device set and a number of data blocks stored in the second logical device set, and wherein the criteria uses the number of expected identical data blocks in determining whether to locate the first logical device set and the second logical device set in the same data storage system or different data storage systems.

3. The method of claim 2, wherein an estimated deduplication percentage is determined using the number of expected blocks, and the one or more criteria specifies to locate the first logical device set and the second logical device set in the same data storage system if the estimated deduplication percentage is greater than a specified threshold percentage.

4. The method of claim 3, wherein the estimated deduplication percentage is determined as a percentage of a size of the first logical device set.

5. The method of claim 3, wherein the estimated deduplication percentage is determined as a percentage of a size of the second logical device set.

6. The method of claim 1, wherein the one or more criteria specifies that the first logical device set and the second logical device set should be located in the same data storage system if the Jaccard Similarity for the first DSI and the second DSI is greater than a specified threshold.

7. The method of claim 1, wherein the Jaccard Similarity for the first DSI and the second DSI is determined as a first size divided by a second size, wherein the first size denotes a number of elements in a set intersection of data blocks of the first logical device set having corresponding hash values in the same subset and data blocks of the second logical device set having corresponding hash values in the same subset, and wherein the second size denotes a number of elements in a set union of data blocks of the first logical device set having corresponding hash values in the same subset and data blocks of the second logical device set having corresponding hash values in the same subset.

8. The method of claim 1, wherein a first plurality of data blocks is stored in the first logical device set, and the method includes:
    generating, using the hash function, the first plurality of hash values for the first plurality of data blocks.

9. The method of claim 8, wherein the hash function generates hash values in the range, and wherein the first DSI for the first logical device set includes a first portion of the first plurality of hash values within a first subrange of the range, wherein the first subrange denotes the same subset of hash values of the range.

10. The method of claim 9, wherein a second plurality of data blocks is stored in the second logical device set, and the method includes:
    generating, using the hash function, a second plurality of hash values for the second plurality of data blocks.

11. The method of claim 10, wherein the second DSI for the second logical device set includes a second portion of the second plurality of hash values within the first subrange of the first range.

12. The method of claim 11, wherein the first subrange is a particular size denoting a number hash values from a minimum value to a maximum value, and the method further comprises:
performing first processing to select the particular size from a plurality of different candidate sizes for the first subrange.

13. The method of claim 1, wherein said determining whether to locate the first logical device set and the second logical device set in the same data storage system or different data storage systems and said locating the first logical device set and the second logical device set in the same data storage system are performed in connection with load balancing in a cluster including the same data storage system and one or more additional data storage systems.

14. The method of claim 13, wherein said same data storage system includes two processing nodes and said load balancing further determines, in accordance with the one or more criteria, to service I/Os directed to both the first logical device set and the second logical device set using a first of the two processing nodes as a preferred one of the two processing nodes.

15. The method of claim 1, wherein the first logical device set and the second logical device set are configured for remote replication from the same data storage system to a same target data storage system that performs deduplication.

16. The method of claim 1, wherein the first DSI only includes hash values of data blocks of the first logical device set which are in the same subset of hash values, and wherein the second DSI only includes hash values of data blocks of the second logical device set which are in the same subset of hash values.

17. A system comprising:
one or more processors; and
a memory comprising code stored thereon that, when executed performs a method comprising:
determining a first data deduplication sample index (DSI) for a first logical device set of a first plurality of logical devices and a second DSI for a second logical device set of a second plurality of logical devices, wherein the first DSI and the second DSI are each associated with a same subset of hash values included in a range of allowable hash values generated by a hash function for corresponding data blocks, and wherein said determining the first DSI includes:
determining a first plurality of DSIs corresponding to the first plurality of logical devices, wherein each of the first plurality of logical devices has a corresponding one of the first plurality of DSIs identifying hash values, for data blocks of said each logical device of the first plurality of logical devices, which are in the same subset of hash values; and
determining the first DSI as a set union of hash values of the first plurality of DSIs; and
wherein said determining the second DSI includes:
determining a second plurality of DSIs corresponding to the second plurality of logical devices, wherein each of the second plurality of logical devices has a corresponding one of the second plurality of DSIs identifying hash values, for data blocks of said each logical device of the second plurality of logical devices, which are in the same subset of hash values; and
determining the second DSI as a set union of hash values of the second plurality of DSIs;
determining a Jaccard Similarity for the first DSI and the second DSI, wherein the Jaccard Similarity denotes a measurement of similarity and mutual deduplication regarding a number of data blocks of the first logical device set expected to match data blocks of the second logical device set;
determining, in accordance with one or more criteria, whether the first logical device set and the second logical device set should be located in different data storage systems or a same data storage system that performs data deduplication with respect to data blocks stored on the first logical device set and the second logical device set, wherein the one or more criteria uses the Jaccard Similarity in determining whether to locate the first logical device set and the second logical device set in the same data storage system or the different data storage systems; and
responsive to determining that the first logical device set and the second logical device set should be located in the same data storage system, locating the first logical device set and the second logical device set in the same data storage system.

18. A non-transitory computer readable medium comprising code stored thereon that, when executed, performs a method of determining and using deduplication estimates comprising:
determining a first data deduplication sample index (DSI) for a first logical device set of a first plurality of logical devices and a second DSI for a second logical device set of a second plurality of logical devices, wherein the first DSI and the second DSI are each associated with a same subset of hash values included in a range of allowable hash values generated by a hash function for corresponding data blocks, and wherein said determining the first DSI includes:
determining a first plurality of DSIs corresponding to the first plurality of logical devices, wherein each of the first plurality of logical devices has a corresponding one of the first plurality of DSIs identifying hash values, for data blocks of said each logical device of the first plurality of logical devices, which are in the same subset of hash values; and
determining the first DSI as a set union of hash values of the first plurality of DSIs; and
wherein said determining the second DSI includes:
determining a second plurality of DSIs corresponding to the second plurality of logical devices, wherein each of the second plurality of logical devices has a corresponding one of the second plurality of DSIs identifying hash values, for data blocks of said each logical device of the second plurality of logical devices, which are in the same subset of hash values; and
determining the second DSI as a set union of hash values of the second plurality of DSIs;
determining a Jaccard Similarity for the first DSI and the second DSI, wherein the Jaccard Similarity denotes a measurement of similarity and mutual deduplication regarding a number of data blocks of the first logical device set expected to match data blocks of the second logical device set;
determining, in accordance with one or more criteria, whether the first logical device set and the second logical device set should be located in different data storage systems or a same data storage system that performs data deduplication with respect to data blocks stored on the first logical device set and the second logical device set, wherein the one or more criteria uses the Jaccard Similarity in determining whether to locate the first logical device set and the second logical device set in the same data storage system or the different data storage systems; and responsive to determining that the first logical device set and the second logical device set should be located in the same data storage system, locating the first logical device set and the second logical device set in the same data storage system.

19. The non-transitory computer readable medium of claim 18, wherein the method further comprises:

determining, using the Jaccard Similarity for the first DSI and the second DSI, a number of expected identical data blocks between the first logical device set and the second logical device set, wherein the number of expected identical blocks is determined by multiplying the Jaccard Similarity for the first DSI and the second DSI by a minimum of a number of data blocks stored in the first logical device set and a number of data blocks stored in the second logical device set, and wherein the criteria uses the number of expected identical data blocks in determining whether to locate the first logical device set and the second logical device set in the same data storage system or different data storage systems.

20. The non-transitory computer readable medium of claim 19, wherein an estimated deduplication percentage is determined using the number of expected blocks, and the one or more criteria specifies to locate the first logical device set and the second logical device set in the same data storage system if the estimated deduplication percentage is greater than a specified threshold percentage.

21. The non-transitory computer readable medium of claim 19, wherein the Jaccard Similarity for the first DSI and the second DSI is determined as a first size divided by a second size, wherein the first size denotes a number of elements in a set intersection of data blocks of the first logical device set having corresponding hash values in the same subset and data blocks of the second logical device set having corresponding hash values in the same subset, and wherein the second size denotes a number of elements in a set union of data blocks of the first logical device set having corresponding hash values in the same subset and data blocks of the second logical device set having corresponding hash values in the same subset.

* * * * *

UNITED STATES PATENT AND TRADEMARK OFFICE
CERTIFICATE OF CORRECTION

| | | |
|---|---|---|
| PATENT NO. | : 11,481,131 B2 | Page 1 of 1 |
| APPLICATION NO. | : 17/110672 | |
| DATED | : October 25, 2022 | |
| INVENTOR(S) | : Dar et al. | |

It is certified that error appears in the above-identified patent and that said Letters Patent is hereby corrected as shown below:

In the Claims

Column 35, Line 4:
In Claim 11, the phrase "the first range" should read -- the range --

Signed and Sealed this
Twentieth Day of December, 2022

*Katherine Kelly Vidal*

Katherine Kelly Vidal
*Director of the United States Patent and Trademark Office*